US011451287B1

(12) United States Patent
Sivaprakasam et al.

(10) Patent No.: US 11,451,287 B1
(45) Date of Patent: Sep. 20, 2022

(54) MULTIPATH FILTERING FOR WIRELESS RF SIGNALS

(71) Applicant: Pivotal Commware, Inc., Kirkland, WA (US)

(72) Inventors: Srinivas Sivaprakasam, Fremont, CA (US); Timothy Hudson Mason, Kirkland, WA (US)

(73) Assignee: Pivotal Commware, Inc., Kirkland, WA (US)

( * ) Notice: Subject to any disclaimer, the term of this patent is extended or adjusted under 35 U.S.C. 154(b) by 0 days.

(21) Appl. No.: 17/203,255

(22) Filed: Mar. 16, 2021

(51) Int. Cl.
*H04B 7/08* (2006.01)
*H04B 1/7117* (2011.01)
*H04W 72/04* (2009.01)
*H04B 7/06* (2006.01)

(52) U.S. Cl.
CPC ......... *H04B 7/0854* (2013.01); *H04B 1/7117* (2013.01); *H04B 7/0617* (2013.01); *H04W 72/042* (2013.01)

(58) Field of Classification Search
CPC .. H04B 7/0854; H04B 7/0617; H04B 1/7117; H04W 72/042
See application file for complete search history.

(56) References Cited

U.S. PATENT DOCUMENTS

| 2,131,108 | A | 9/1938 | Lindenblad |
|---|---|---|---|
| 4,464,663 | A | 8/1984 | Lalezari et al. |
| 6,133,880 | A | 10/2000 | Grangeat et al. |
| 6,150,987 | A | 11/2000 | Sole et al. |
| 6,529,745 | B1 * | 3/2003 | Fukagawa ................. G01S 3/74 455/562.1 |
| 6,680,923 | B1 | 1/2004 | Leon |
| 7,084,815 | B2 | 8/2006 | Phillips et al. |
| 7,205,949 | B2 | 4/2007 | Turner |

(Continued)

FOREIGN PATENT DOCUMENTS

| CN | 102948089 A | 2/2013 |
|---|---|---|
| CN | 106664124 A | 5/2017 |

(Continued)

OTHER PUBLICATIONS

Office Communication for U.S. Appl. No. 16/846,670 dated Apr. 2, 2021, pp. 1-9.

(Continued)

*Primary Examiner* — Jean B Corrielus
(74) *Attorney, Agent, or Firm* — John W. Branch; Branch Partners PLLC

(57) ABSTRACT

Filtering for sampled data representing uplink wireless RF signals monitored by a pair of antennas is provided to improve accuracy in determining an angular location of an identified UE. An extracted portion of the filtered sampled data is used to improve accuracy in determining an angular location of the identified UE. The extracted portion represents direct path uplink wireless RF signals that have traveled by a line of sight between the pair of antennas and the identified UE. Another portion of the filtered sampled data is cancelled, which represents multiple path (multipath) uplink wireless RF signals that have traveled a longer distance than the direct path signals due to reflection from one or more surfaces on multiple paths between the identified UE and the pair of antennas.

20 Claims, 14 Drawing Sheets

(56) References Cited

U.S. PATENT DOCUMENTS

| | | |
|---|---|---|
| 9,356,356 B2 | 5/2016 | Chang et al. |
| 9,385,435 B2 | 7/2016 | Bily et al. |
| 9,450,310 B2 | 9/2016 | Bily et al. |
| 9,551,785 B1 | 1/2017 | Geer |
| 9,635,456 B2 | 4/2017 | Fenichel |
| 9,711,852 B2 | 7/2017 | Chen et al. |
| 9,806,414 B2 | 10/2017 | Chen et al. |
| 9,806,415 B2 | 10/2017 | Chen et al. |
| 9,806,416 B2 | 10/2017 | Chen et al. |
| 9,812,779 B2 | 11/2017 | Chen et al. |
| 9,813,141 B1 | 11/2017 | Marupaduga et al. |
| 9,955,301 B2 | 4/2018 | Markhovsky et al. |
| 10,033,109 B1 | 7/2018 | Gummalla et al. |
| 10,225,760 B1 | 3/2019 | Black |
| 10,277,338 B2 | 4/2019 | Reial et al. |
| 10,313,894 B1 | 6/2019 | Desclos et al. |
| 10,324,158 B2 * | 6/2019 | Wang .................. G01S 3/74 |
| 10,431,899 B2 | 10/2019 | Bily et al. |
| 10,468,767 B1 | 11/2019 | McCandless et al. |
| 10,505,620 B2 * | 12/2019 | Ito .................. H04B 17/364 |
| 10,734,736 B1 | 8/2020 | McCandless et al. |
| 11,190,266 B1 | 11/2021 | Black et al. |
| 11,252,731 B1 | 2/2022 | Levitsky et al. |
| 2002/0196185 A1 | 12/2002 | Bloy |
| 2003/0025638 A1 | 2/2003 | Apostolos |
| 2004/0003250 A1 | 1/2004 | Kindberg et al. |
| 2004/0038714 A1 | 2/2004 | Rhodes et al. |
| 2004/0229651 A1 | 11/2004 | Hulkkonen et al. |
| 2005/0237265 A1 | 10/2005 | Durham et al. |
| 2005/0282536 A1 | 12/2005 | McClure et al. |
| 2006/0025072 A1 | 2/2006 | Pan |
| 2007/0024514 A1 | 2/2007 | Phillips et al. |
| 2007/0147338 A1 | 6/2007 | Chandra et al. |
| 2007/0184828 A1 | 8/2007 | Majidi-Ahy |
| 2007/0202931 A1 | 8/2007 | Lee et al. |
| 2008/0039012 A1 | 2/2008 | McKay et al. |
| 2008/0049649 A1 | 2/2008 | Kozisek et al. |
| 2008/0181328 A1 | 7/2008 | Harel et al. |
| 2009/0176487 A1 | 7/2009 | DeMarco |
| 2009/0207091 A1 | 8/2009 | Anagnostou et al. |
| 2009/0296938 A1 | 12/2009 | Devanand et al. |
| 2010/0197222 A1 | 8/2010 | Scheucher |
| 2010/0248659 A1 | 9/2010 | Kawabata |
| 2010/0302112 A1 | 12/2010 | Lindenmeier et al. |
| 2011/0070824 A1 | 3/2011 | Braithwaite |
| 2011/0199279 A1 | 8/2011 | Shen et al. |
| 2011/0292843 A1 | 12/2011 | Gan et al. |
| 2012/0064841 A1 | 3/2012 | Husted et al. |
| 2012/0094630 A1 | 4/2012 | Wisnewski et al. |
| 2012/0194399 A1 | 8/2012 | Bily et al. |
| 2013/0059620 A1 | 3/2013 | Cho |
| 2013/0069834 A1 | 3/2013 | Duerksen |
| 2013/0231066 A1 | 9/2013 | Zander et al. |
| 2013/0303145 A1 | 11/2013 | Harrang et al. |
| 2013/0324076 A1 | 12/2013 | Harrang |
| 2014/0094217 A1 | 4/2014 | Stafford |
| 2014/0171811 A1 | 6/2014 | Lin et al. |
| 2014/0198684 A1 | 7/2014 | Gravely et al. |
| 2014/0266946 A1 | 9/2014 | Bily et al. |
| 2014/0269417 A1 | 9/2014 | Yu et al. |
| 2014/0293904 A1 | 10/2014 | Dai et al. |
| 2014/0308962 A1 | 10/2014 | Zhang et al. |
| 2014/0349696 A1 | 11/2014 | Hyde et al. |
| 2015/0109178 A1 | 4/2015 | Hyde et al. |
| 2015/0109181 A1 | 4/2015 | Hyde et al. |
| 2015/0116153 A1 | 4/2015 | Chen et al. |
| 2015/0131618 A1 | 5/2015 | Chen |
| 2015/0162658 A1 | 6/2015 | Bowers et al. |
| 2015/0222021 A1 | 8/2015 | Stevenson et al. |
| 2015/0229028 A1 | 8/2015 | Bily et al. |
| 2015/0236777 A1 | 8/2015 | Akhtar et al. |
| 2015/0276926 A1 | 10/2015 | Bowers et al. |
| 2015/0276928 A1 | 10/2015 | Bowers et al. |
| 2015/0288063 A1 | 10/2015 | Johnson et al. |
| 2015/0318618 A1 | 11/2015 | Chen et al. |
| 2015/0372389 A1 | 12/2015 | Chen et al. |
| 2016/0037508 A1 | 2/2016 | Sun |
| 2016/0079672 A1 | 3/2016 | Cerreno |
| 2016/0087334 A1 | 3/2016 | Sayama et al. |
| 2016/0149308 A1 | 5/2016 | Chen et al. |
| 2016/0149309 A1 | 5/2016 | Chen et al. |
| 2016/0149310 A1 | 5/2016 | Chen et al. |
| 2016/0164175 A1 | 6/2016 | Chen et al. |
| 2016/0174241 A1 | 6/2016 | Ansari et al. |
| 2016/0198334 A1 | 7/2016 | Bakshi et al. |
| 2016/0219539 A1 | 7/2016 | Kim et al. |
| 2016/0241367 A1 | 8/2016 | Irmer et al. |
| 2016/0269964 A1 | 9/2016 | Murray |
| 2016/0345221 A1 | 11/2016 | Axmon et al. |
| 2016/0365754 A1 | 12/2016 | Zeine et al. |
| 2016/0373181 A1 | 12/2016 | Black et al. |
| 2017/0118750 A1 | 4/2017 | Kikuma et al. |
| 2017/0127295 A1 | 5/2017 | Black et al. |
| 2017/0127296 A1 | 5/2017 | Gustafsson et al. |
| 2017/0127332 A1 | 5/2017 | Axmon et al. |
| 2017/0155192 A1 | 6/2017 | Black et al. |
| 2017/0155193 A1 | 6/2017 | Black et al. |
| 2017/0187123 A1 | 6/2017 | Black et al. |
| 2017/0187426 A1 | 6/2017 | Su et al. |
| 2017/0194704 A1 | 7/2017 | Chawgo et al. |
| 2017/0195054 A1 | 7/2017 | Ashrafi |
| 2017/0238141 A1 | 8/2017 | Lindoff et al. |
| 2017/0310017 A1 | 10/2017 | Howard |
| 2017/0339575 A1 | 11/2017 | Kim et al. |
| 2017/0367053 A1 | 12/2017 | Noh et al. |
| 2017/0373403 A1 | 12/2017 | Watson |
| 2018/0013193 A1 | 1/2018 | Olsen et al. |
| 2018/0027555 A1 | 1/2018 | Kim et al. |
| 2018/0066991 A1 | 3/2018 | Mueller et al. |
| 2018/0097286 A1 | 4/2018 | Black et al. |
| 2018/0123692 A1 | 5/2018 | Leiba |
| 2018/0177461 A1 | 6/2018 | Bell et al. |
| 2018/0219283 A1 | 8/2018 | Wilkins et al. |
| 2018/0227035 A1 | 8/2018 | Cheng et al. |
| 2018/0227445 A1 | 8/2018 | Minegishi |
| 2018/0233821 A1 | 8/2018 | Pham et al. |
| 2018/0270729 A1 | 9/2018 | Ramachandra et al. |
| 2018/0301821 A1 | 10/2018 | Black et al. |
| 2018/0337445 A1 | 11/2018 | Sullivan et al. |
| 2018/0368389 A1 | 12/2018 | Adams |
| 2019/0020107 A1 | 1/2019 | Polehn et al. |
| 2019/0052428 A1 | 2/2019 | Chu et al. |
| 2019/0053013 A1 | 2/2019 | Markhovsky et al. |
| 2019/0067813 A1 | 2/2019 | Igura |
| 2019/0219982 A1 | 7/2019 | Klassen et al. |
| 2019/0221931 A1 | 7/2019 | Black et al. |
| 2019/0289482 A1 | 9/2019 | Black |
| 2019/0336107 A1 | 11/2019 | Hope Simpson et al. |
| 2020/0008163 A1 | 1/2020 | Black et al. |
| 2020/0137698 A1 | 4/2020 | Black et al. |
| 2020/0186227 A1 | 6/2020 | Reider et al. |
| 2020/0205012 A1 | 6/2020 | Bengtsson et al. |
| 2020/0259552 A1 | 8/2020 | Ashworth |
| 2020/0313741 A1 | 10/2020 | Zhu et al. |
| 2021/0067237 A1 | 3/2021 | Sampath et al. |
| 2021/0234591 A1 | 7/2021 | Eleftheriadis et al. |
| 2021/0368355 A1 | 11/2021 | Liu et al. |
| 2022/0014933 A1 | 1/2022 | Moon et al. |
| 2022/0053433 A1 | 2/2022 | Abedini et al. |

FOREIGN PATENT DOCUMENTS

| | | | |
|---|---|---|---|
| CN | 106797074 A | 5/2017 | |
| EP | 3273629 A1 * | 1/2018 | ............... H04B 7/04 |
| JP | 61-1102 A | 1/1986 | |
| JP | 936656 A | 2/1997 | |
| JP | 2000111630 A * | 4/2000 | |
| JP | 3307146 B2 * | 7/2002 | |
| JP | 3600459 B2 * | 12/2004 | |
| JP | 2007081648 A | 3/2007 | |
| JP | 2007306273 A | 11/2007 | |
| JP | 2008-153798 A | 7/2008 | |
| JP | 2012-175189 A | 9/2012 | |
| JP | 2014207626 A | 10/2014 | |

(56) References Cited

FOREIGN PATENT DOCUMENTS

| JP | 2017-220825 A | 12/2017 |
|---|---|---|
| JP | 2018-173921 A | 11/2018 |
| KR | 10 2016 011310 A | 9/2016 |
| WO | 2010104435 A1 | 9/2010 |
| WO | 2012050614 A1 | 4/2012 |
| WO | 2012161612 A1 | 11/2012 |
| WO | 2013023171 A1 | 2/2013 |
| WO | 2015196044 A1 | 12/2015 |
| WO | 2016044069 A1 | 3/2016 |
| WO | 2017014842 A1 | 1/2017 |
| WO | 2017193056 A1 | 11/2017 |
| WO | 2018144940 A1 | 8/2018 |
| WO | 2018179870 A1 | 10/2018 |

OTHER PUBLICATIONS

Office Communication for U.S. Appl. No. 16/730,690 dated Apr. 8, 2021, pp. 1-11.
Office Communication for U.S. Appl. No. 17/177,131 dated Apr. 9, 2021, pp. 1-17.
Vu, Trung Kien et al., "Joint Load Balancing and Interference Mitigation in 5G Heterogeneous Networks," IEEE Transactions on Wireless Communications, 2017, vol. 16, No. 9, pp. 6032-6046.
Office Communication for U.S. Appl. No. 17/177,145 dated Apr. 19, 2021, pp. 1-11.
Office Communication for U.S. Appl. No. 17/112,940 dated Aug. 9, 2021, pp. 1-20.
International Search Report and Written Opinion for International Patent Application No. PCT/US2021/034479 dated Aug. 10, 2021, pp. 1-7.
Office Communication for U.S. Appl. No. 17/332,136 dated Sep. 2, 2021, pp. 1-9.
Office Communication for Chinese Patent Application No. 201980019925.1 dated Sep. 27, 2021, pp. 1-25.
Office Communication for U.S. Appl. No. 17/177,145 dated Oct. 14, 2021, pp. 1-5.
International Search Report and Written Opinion for International Patent Application No. PCT/US2021/043308 dated Nov. 2, 2021, pp. 1-8.
Office Communication for U.S. Appl. No. 17/177,131 dated Nov. 12, 2021, pp. 1-5.
Extended European Search Report for European Patent Application No. 19772471.9 dated Nov. 8, 2021, pp. 1-8.
Office Communication for U.S. Appl. No. 17/177,145 dated Nov. 16, 2021, pp. 1-16.
Office Communication for U.S. Appl. No. 17/177,131 dated Dec. 17, 2021, pp. 1-14.
Black, Eric J., "Holographic Beam Forming and MIMO," Pivotal Commware, 2017, pp. 1-8.
Björn, Ekman, "Machine Learning for Beam Based Mobility Optimization in NR," Master of Science Thesis in Communication Systems, Department of Electrical Engineering, Linköping University, 2017, pp. 1-85.
Office Communication for U.S. Appl. No. 17/112,940 dated Dec. 22, 2021, pp. 1-15.
International Search Report and Written Opinion for International Patent Application No. PCT/US2021/049502 dated Dec. 14, 2021, pp. 1-8.
Office Communication for U.S. Appl. No. 17/469,694 dated Jan. 20, 2022, pp. 1-9.
Office Communication for U.S. Appl. No. 14/510,947, dated Jun. 15, 2018, pp. 1-9.
U.S. Appl. No. 14/510,947, filed Oct. 9, 2014, pp. 1-76.
Office Communication for U.S. Appl. No. 16/049,630 dated Oct. 4, 2018, pp. 1-13.
Office Communication for U.S. Appl. No. 15/870,758 dated Oct. 1, 2018, pp. 1-12.
Office Communication for U.S. Appl. No. 16/136,119 dated Nov. 23, 2013, pp. 1-12.
Office Communication for U.S. Appl. No. 16/136,119 dated Mar. 15, 2019, pp. 1-8.
Office Communication for U.S. Appl. No. 16/292,022 dated Jun. 7, 2019, pp. 1-13.
Office Communication for U.S. Appl. No. 16/049,630 dated Apr. 12, 2019, pp. 1-13.
Office Communication for U.S. Appl. No. 16/268,469 dated May 16, 2019, pp. 1-16.
Office Communication for U.S. Appl. No. 16/280,939 dated May 13, 2019, pp. 1-22.
Office Communication for U.S. Appl. No. 16/440,815 dated Jul. 17, 2019, pp. 1-16.
Office Communication for U.S. Appl. No. 16/358,112 dated May 15, 2019, pp. 1-17.
International Search Report and Written Opinion for International Application No. PCT/US2019/022942 dated Jul. 4, 2019, pp. 1-12.
Yurduseven, Okan et al., "Dual-Polarization Printed Holographic Multibeam Metasurface Antenna" Aug. 7, 2017, IEEE Antennas and Wireless Propagation Letters. PP. 10.1109/LAWP.2017, pp. 1-4.
International Search Report and Written Opinion for International Application No. PCT/US2019/022987 dated Jul. 2, 2019, pp. 1-13.
Office Communication for U.S. Appl. No. 16/049,630 dated Jun. 24, 2019, pp. 1-5.
Office Communication for U.S. Appl. No. 16/280,939 dated Jul. 18, 2019, pp. 1-7.
Office Communication for U.S. Appl. No. 16/049,630 dated Aug. 7, 2019, pp. 1-13.
Office Communication for U.S. Appl. No. 16/292,022 dated Sep. 23, 2019, pp. 1-9.
Office Communication for U.S. Appl. No. 16/440,815 dated Oct. 7, 2019, pp. 1-5.
Office Communication for U.S. Appl. No. 16/268,469 dated Sep. 10, 2019, pp. 1-11.
International Search Report and Written Opinion for International Application No. PCT/US2019/041053 dated Aug. 27, 2019, pp. 1-8.
Office Communication for U.S. Appl. No. 16/568,096 dated Oct. 24, 2019, pp. 1-10.
International Search Report and Written Opinion for International Application No. PCT/US2019/047093 dated Oct. 21, 2019, pp. 1-7.
Office Communication for U.S. Appl. No. 16/049,630 dated Dec. 9, 2019, pp. 1-13.
Office Communication for U.S. Appl. No. 16/440,815 dated Jan. 8, 2020, pp. 1-8.
Office Communication for U.S. Appl. No. 16/730,932 dated Mar. 6, 2020, pp. 1-13.
Office Communication for U.S. Appl. No. 16/049,630 dated Mar. 31, 2020, pp. 1-15.
Office Communication for U.S. Appl. No. 16/734,195 dated Mar. 20, 2020, pp. 1-8.
Office Communication for U.S. Appl. No. 16/846,670 dated Jun. 11, 2020, pp. 1-12.
Office Communication for U.S. Appl. No. 16/673,852 dated Jun. 24, 2020, pp. 1-11.
International Search Report and Written Opinion for Application No. PCT/US2020/016641 dated Apr. 14, 2020, pp. 1-7.
Gao, S.S. et al., "Holographic Artificial Impedance Surface Antenna Based on Circular Patch", 2018 International Conference on Microwave and Millimeter Wave Technology (ICMMT), 2018, pp. 1-3.
Nishiyama, Eisuke et al., "Polarization Controllable Microstrip Antenna using Beam Lead PIN Diodes", 2006 Asia-Pacific Microwave Conference, 2006, pp. 1-4.
International Search Report and Written Opinion for Application No. PCT/US2020/013713 dated Apr. 21, 2020, pp. 1-8.
Office Communication for U.S. Appl. No. 16/049,630 dated Aug. 19, 2020, pp. 1-18.
Office Communication for U.S. Appl. No. 16/730,932 dated Aug. 25, 2020, pp. 1-5.
Office Communication for U.S. Appl. No. 16/983,927 dated Aug. 31, 2020, pp. 1-7.
Office Communication for U.S. Appl. No. 16/983,978 dated Sep. 16, 2020, pp. 1-7.
Office Communication for U.S. Appl. No. 16/049,630 dated Oct. 15, 2020, pp. 1-16.

(56) References Cited

OTHER PUBLICATIONS

Office Communication for U.S. Appl. No. 16/983,978 dated Oct. 27, 2020, pp. 1-13.
International Search Report and Written Opinion for Application No. PCT/US2020/048806 dated Nov. 17, 2020, pp. 1-9.
Office Communication for U.S. Appl. No. 16/673,852 dated Nov. 25, 2020, pp. 1-8.
Office Communication for U.S. Appl. No. 16/846,670 dated Nov. 25, 2020, pp. 1-13.
Office Communication for U.S. Appl. No. 16/983,927 dated Jan. 6, 2021, pp. 1-8.
Office Communication for U.S. Appl. No. 16/846,670 dated Feb. 8, 2021, pp. 1-4.
Office Communication for U.S. Appl. No. 16/983,978 dated Feb. 10, 2021, pp. 1-11.
Office Communication for U.S. Appl. No. 17/112,940 dated Jul. 21, 2021, pp. 1-22.
International Search Report and Written Opinion for International Patent Application No. PCT/US2021/026400 dated Jul. 20, 2021, pp. 1-7.
Office Communication for U.S. Appl. No. 17/177,145 dated Aug. 3, 2021, pp. 1-16.
Office Communication for U.S. Appl. No. 17/177,131 dated Aug. 6, 2021, pp. 1-16.
Office Communication for U.S. Appl. No. 17/537,233 dated Feb. 4, 2022, pp. 1-9.
Office Communication for U.S. Appl. No. 17/112,940 dated Mar. 17, 2022, pp. 1-16.
Office Communication for U.S. Appl. No. 17/576,832 dated Mar. 18, 2022, pp. 1-15.
Office Communication for U.S. Appl. No. 17/177,145 dated Mar. 24, 2022, pp. 1-18.
Office Communication for U.S. Appl. No. 17/306,361 dated Mar. 28, 2022, pp. 1-7.
Extended European Search Report for European Patent Application No. 19844867.2 dated Mar. 30, 2022, pp. 1-16.
Office Communication for U.S. Appl. No. 17/576,832 dated Apr. 1, 2022, pp. 1-14.
Office Communication for U.S. Appl. No. 17/585,418 dated Apr. 8, 2022, pp. 1-9.
Office Communication for U.S. Appl. No. 17/537,233 dated Apr. 20, 2022, pp. 1-9.

* cited by examiner

The equations below are the expected signals seen by the two antennas. $X_{i_t}$ is the received signal at antenna i with a sample shift of t where $\phi_{ij}$ is the phase associated with path $P_{ij}$. A is the reflection amplitude (assumed equal for both reflection paths), $$X_{i0} = e^{j(\phi_{00})}S_0(t) + Ae^{j(\phi_{01})}S_0(t-1)e^{j\beta} \quad (1)$$

$$X_{j0} = e^{j(\phi_{10})}S_0(t) + Ae^{j(\phi_{11})}S_0(t-1)e^{j\beta} \quad (2)$$

$$X_{i1} = e^{j(\phi_{00})}S_0(t+1) + Ae^{j(\phi_{01})}S_0(t)e^{j\beta} \quad (3)$$

$$X_{j1} = e^{j(\phi_{10})}S_0(t+1) + Ae^{j(\phi_{11})}S_0(t)e^{j\beta} \quad (4)$$

Calculating the correlation dot products in the following equations where $R_{i_t j_t}$ is the conjugate dot product $X_{i_t} \cdot conj(X_{j_t})$

FIG. 5B $$R_{i0j0} = e^{j(\phi_{00}-\phi_{10})} + A^2 e^{j(\phi_{01}-\phi_{11})} \qquad (5)$$

$$R_{i0j1} = A e^{j(\phi_{00}-\phi_{11})} e^{-j\beta} \qquad (6)$$

$$R_{i0i1} = A e^{j(\phi_{00}-\phi_{01})} e^{-j\beta} \qquad (7)$$

$$R_{j0j1} = A e^{j(\phi_{10}-\phi_{11})} e^{-j\beta} \qquad (8)$$

$$\beta = \pi F_c T_s \qquad (9)$$

Multiplying $R_{i0j1}$ by conj $(R_{i0i1})$ yields $$R_{i0j1} * conj(R_{i0i1}) = A^2 e^{j(\phi_{01}-\phi_{11})} \qquad (10)$$

$$R_{i0j0} - R_{i0j1} * conj(R_{i0i1}) = e^{j(\phi_{00}-\phi_{10})} \qquad (11)$$

$$R_{x0x0} = \begin{bmatrix} R_{i0i0} & R_{i0j0} \\ R_{j0i0} & R_{j0j0} \end{bmatrix}$$

$$R_{x0x1} = \begin{bmatrix} R_{i0i1} & R_{i0j1} \\ R_{j0i1} & R_{j0j1} \end{bmatrix}$$

We need $$R_{needed} = \begin{bmatrix} R_{i0i0} - R_{i0i1} * conj(R_{i0i1}) & R_{i0j0} - R_{i0j1} * conj(R_{i0i1}) \\ R_{j0i0} - R_{j0i1} * conj(R_{j0j1}) & R_{j0j0} - R_{j0j1} * conj(R_{j0j1}) \end{bmatrix}$$

We create a matrix $R_{x0x1diag}$ from the diagonal elements of $R_{x0x1}$ repeated for each row.

$$R_{x0x1diag} = \begin{bmatrix} R_{i0i1} & R_{i0i1} \\ R_{j0j1} & R_{j0j1} \end{bmatrix}$$

Efficient calculation of a matrix with the sample shifted correlations removed is then $$R_{needed} = R_{i0j0} - R_{x0x1} * conj(R_{x0x1diag}) \qquad (12)$$

or $$R_{needed} = \begin{bmatrix} R_{i0i0} & R_{i0j0} \\ R_{j0i0} & R_{j0j0} \end{bmatrix} - \begin{bmatrix} R_{i0i1} & R_{i0j1} \\ R_{j0i1} & R_{j0j1} \end{bmatrix} * \begin{bmatrix} conj(R_{i0i1}) & conj(R_{i0i1}) \\ conj(R_{j0j1}) & conj(R_{j0j1}) \end{bmatrix}$$

FIG. 5C

MULTIPATH FILTERING FOR WIRELESS RF SIGNALS

TECHNICAL FIELD

The invention relates generally to employing one or more antennas to radiate one or more beams of wireless RF signals for communication with a plurality of wireless devices. Further, in various embodiments, the invention provides for improved filtering of angle of arrival information for uplink wireless RF signals based on downlink wireless RF signals to a plurality of user wireless devices (UEs).

BACKGROUND

User wireless devices (UEs), such as mobile smartphones, are the primary mode of communication for the vast majority of people worldwide. In the first few generations of wireless communication networks, mobile devices were generally used for voice communication, text messages, and somewhat limited internet access. Each new generation of wireless communication networks has provided substantially more bandwidth for different types services for mobile device users, such as purchasing products, paying invoices, streaming movies, playing video games, online learning, dating, multimedia messaging, and more. Also, as wireless communication networks have advanced from first generation technology to fourth generation, the frequency and strength of the wireless RF signals have increased to provide greater bandwidth with less latency. Historically, omnidirectional and/or sector antennas have been used to communicate wireless RF signals between wireless devices and for each generation of wireless communication networks.

In modern 4G data systems, data rates are often limited by the low directivity of sector antennas employed by base stations to wirelessly communicate with UEs. However, holographic beam forming antennas have high directivity, and these antennas can provide much higher data rates by directly pointing a beam of wireless signals at a UE. The more accurately the azimuth and the elevation can be identified for a UE relative to a holographic beam forming antenna, the more effectively the antenna can point the beam to provide higher data rates. Also, if the holographic beam forming antenna is providing separate beams corresponding to a plurality of UEs in wireless communication with a remote base station, knowledge of a protocol schedule is needed to identify when to point a separate beam at each of the plurality of UEs according to the schedule.

Holographic beam forming systems often include an Angle of Arrival detector that uses an array of antennas to sense a UE's angular location based on a sampling of the UE's uplink wireless RF signals. However, an accuracy of this angular location may be compromised by the presence of a substantial amount of both direct path uplink wireless RF signals and multiple path uplink wireless RF signals received by the array of antennas. In the past, increasing the number of antennas in the array has been tried to improve the accuracy determining the angular location of a UE when such conditions exist. Unfortunately, increasing the number of antennas and their corresponding sampling has often provided minimal improvement in the accuracy of determining an angular location in the presence of substantial amounts of both direct path and multiple path uplink wireless RF signals. Also, increasing the number of antennas and the amount of data that is processed can increase cost and energy consumption. Thus, there is a need to improve accuracy in determining an angular location of a UE while reducing cost, energy consumption, computational resources, and minimizing the number of antennas.

BRIEF DESCRIPTION OF THE DRAWINGS

FIGS. 5B and 5C illustrate equations that employ two separate cross correlated matrices populated with either sampled data or shifted sampled data to cancel out portion of the sampled data representing multipath reflections of uplink wireless RF signals and extract a filter portion of the sampled data representing direct path uplink wireless RF signals monitored by two antennas, in accordance with the invention.

DESCRIPTION OF THE VARIOUS EMBODIMENTS

Figure 1A:
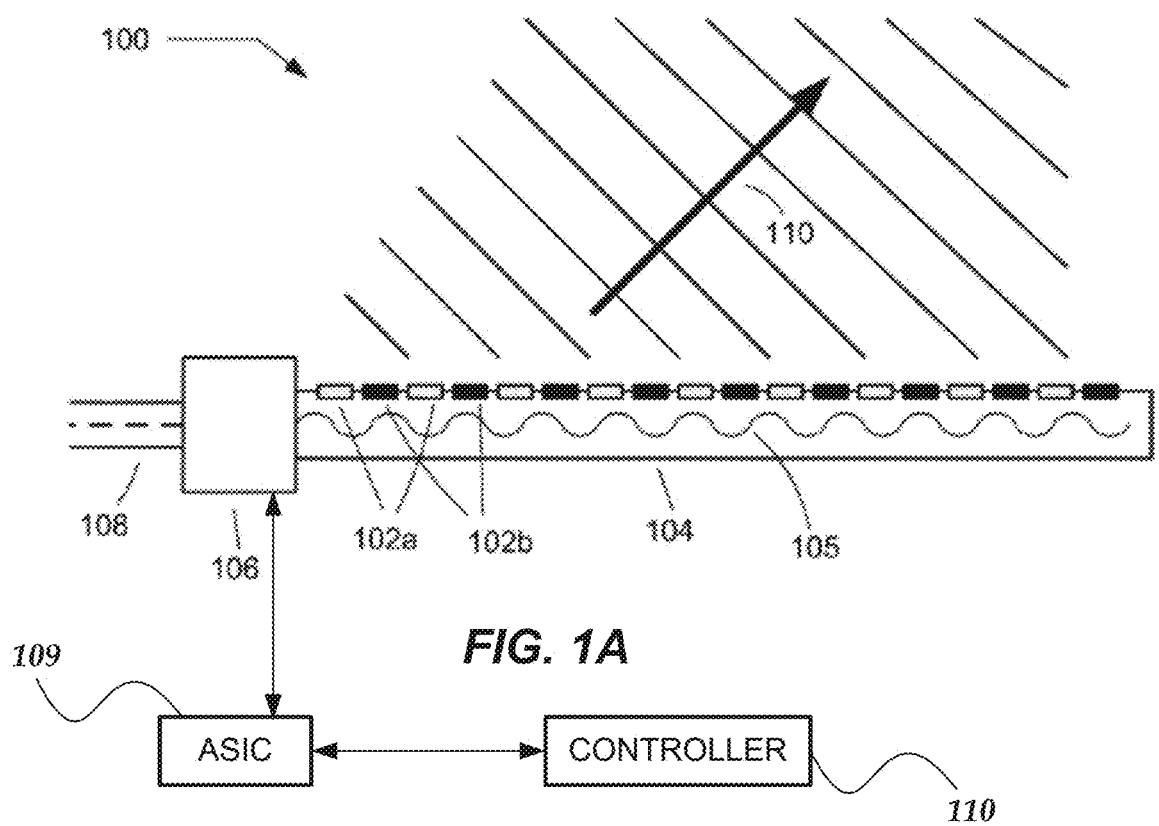
FIG. 1A shown an embodiment of an exemplary surface scattering antenna with multiple varactor elements arranged to propagate electromagnetic waves in such a way as to form an exemplary instance of holographic metasurface antennas (HMA)

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

As used herein, "base station" refers to a network computing device that facilitates wireless communication between a wireless network and a plurality of different types of wireless computing devices employed by users, which can also be referred to as user equipment (UE). The wireless network can be employ any type of wireless communication protocols or wireless technologies.

As used herein, "angle of arrival" (AoA) refers to a direction from which a wireless signal is received from a remotely located wireless computing device. Measurement of the AoA is typically performed by determining the direction of propagation of a wireless signal waveforms incident on an antenna array or determined from maximum signal strength during rotation of an antenna. The antenna array includes two or more antenna elements, which may include one or different types of antenna, such as sector antennas or omnidirectional antennas. Generally, the AoA may be calculated by measuring a time difference of arrival (TDOA) between individual antenna elements in the antenna array.

In one or more embodiments, the TDOA measurement is determined by measuring the difference in the received phase of each antenna element in the antenna array. For example, in AoA determinations, the delay of arrival at each element is measured directly and converted to an AoA measurement. One application of AoA is in determining geolocation information for various types of wireless remote user computing devices, such as mobile telephones, wireless tablets, wireless modems, wireless notebooks, wireless pagers, wireless electronic book readers, and the like. Typically, multiple transceivers for a base station are employed to calculate the AoA of a particular remote wireless computing device's signal, and this AoA information is combined to determine the geolocation of the device during transmission of wireless signals received by the base station. In one or more embodiments, the AoA calculations may be determined for a wide range of electromagnetic frequencies.

Historically, Angle of Arrival (AoA) detection of a distant wireless RF signal source is sensed using an array of antennas of known geometry in which the wireless RF signal monitored at each antenna is sampled and digitized over time. The time sampled data from each antenna may be compared using pair wise complex dot products to form a cross correlation matrix. Since the relative phases of each antenna are expected to be functions of the incident azimuth and elevation relative to the antenna array, the cross correlation results may be analyzed to determine the azimuth and elevation angle that best fits the measured relative phase differences. However, the presence of a wave of coherent multiple path reflections of an uplink wireless RF signal which, when combined with a direct path (line of sight) wave, or additional multiple path waves, can result in an uplink wireless RF signal for which the best fit azimuth and elevation for the UE transmitting the uplink wireless RF signal may be far removed from any expected incident (line of sight—direct) wave. Further, an incorrect sensing/determining of an actual angular location of the UE can result in an incorrect pointing of a corresponding downlink wireless RF signal communicated by the remotely located base station to the UE.

Generally, since the shortest path for wireless RF signals from a source to a receiver is a straight line offered by a direct path (line of sight), wireless RF signals that reflect off surfaces travel longer multiple paths before they arrive at the receiver. Also, if the multiple paths of reflected wireless RF signals are sufficiently long that these RF signals arrive at the receiver a full sample period after the direct path wireless RF signals, then the resulting sampled data at the receiver may also contain the direct (line of sight) wireless RF signal, and added to this, a copy of the multiple path (multipath) wireless RF signal time shifted by one or more sample periods.

Unfortunately, conventional angle of arrival techniques to determine an angular location are often less accurate when the sampled data for monitored wireless RF signals includes significant portions of both direct path wireless RF signals and multipath wireless RF signals. Also, since the time sampling of data sums together the direct path and the multipath uplink wireless RF signals, a typical single cross correlation matrix may not provide enough direct isolation/filtering of the two distinct types of wireless RF signals to improve the accuracy of determining an angular location.

Briefly stated, various embodiments of the novel invention are directed to a method, apparatus, or a system that improves wireless communication between a remotely located wireless base station and a plurality of user wireless devices (UEs). The various embodiments employ novel filtering for sampled data representing uplink wireless RF signals monitored by each pair of antennas in an M×N array of antennas to improve accuracy in determining an angular location of an identified UE. An extracted portion of the filtered sampled data is used to improve accuracy in determining an angular location of the identified UE. The extracted portion represents direct path uplink wireless RF signals that have traveled by a line of sight between each pair of antennas and the identified UE. Another portion of the filtered sampled data is cancelled, which represents multiple path (multipath) uplink wireless RF signals that have traveled a longer distance than the direct path signals due to reflection from one or more surfaces on multiple paths between the identified UE and each pair of antennas.

In one or more of the various embodiments, the filtering employs novel comparisons of a first cross correlation matrix of sampled data and to another cross correlation matrix of shifted sampled data to extract a filtered portion of the sampled data corresponding to direct path uplink wireless RF signals and cancel another filtered portion of the sampled data corresponding to multipath uplink wireless RF signals. As shown in the exemplary equations illustrated in FIGS. 5B and 5C, a first cross correlation matrix, R_00, contains a set of complex conjugate dot product results of the sampled data for each pair of antennas. The extra (second) cross correlation matrix, R_01 contains a similar matrix except that for an antenna pair the correlation is performed on A_0 B_1, where A_0 is the data from antenna A, and B_1 is the data from antenna B shifted by 1 sample. This extra (second) correlation matrix isolates the multipath correlation contribution so that it can be subtracted from the first correlation matrix.

In one or more of the various embodiments, the monitored uplink wireless RF signals may be sampled in real time or stored and sampled at a later time. Also, in one or more of the various embodiments, a type of each pair of antennas in an M×N array of antennas may be an omnidirectional antenna, or a sector directional antenna. Further, in one or more embodiments, the sampling of the data representing the uplink wireless RF signals monitored by each pair of antennas may be performed synchronously, asynchronously, continuously, periodically, and/or intermittently.

In one or more of the various embodiments, one or more additional pairs of antennas may be employed to monitor the uplink wireless RF signals and provide other sampled data that is additionally employed to improve an accuracy of determining the angular location of each identified UE. Further, the other sampled data may be employed to extract another filtered portion from the other sampled data that represents the direct monitored uplink wireless RF signals received by the additional other pairs of antennas.

In one or more of the various embodiments, each pair of antennas may be integrated with an Angle of Arrival (AoA) detector, or may be remotely located from the AoA detector. Also, in one or more of the various embodiments, the accuracy of an Angle of Arrival detector determining the angular location of an identified UE with a pair (two) of antennas based on sampling uplink wireless RF signals from one or more identified UEs is improved with the results of a comparison of a cross correlation matrix of sampled data for uplink wireless RF signals to another (second) cross correlation matrix of shifted sampled data. Also, in one or more of the various embodiments, the use of a pair of antennas to monitor and sample uplink wireless RF signals can reduce cost, energy consumption, and computational resources. Further, the use of just one pair of antennas may increase reliability by reducing the total number of elements and devices employed to accurately determine an angular location of an identified UE.

In one or more embodiments, the filtering of the sampled data may not significantly improve an accuracy of the determined angular location of the identified UE based on the physical proximity of the UE to a pair of antennas being too close or too far from each other, and/or a physical size of a waveform for the uplink wireless RF signal. For example, an improvement in accuracy might be negligible, e.g., 10% or less, when the physical distance between the UE and the pair of antennas is short, e.g., 4 meters or less. Similarly, when the physical distance between the UE and the pair of antennas is long, e.g., 1000 feet or more, the improvement in accuracy may be negligible, e.g., 10% or less. Thus, a range of physical proximity between each pair of antennas and the identified UE may be employed to determine when to employ filtering of sampled data. In one or more embodiments, an exemplary range may have a low limit, and a high limit. Thus, when a physical proximity of an identified UE to a pair of antennas is within the range, a portion of the sampled data may be extracted that represents just direct path uplink wireless RF signals. This extracted portion may be employed to improve the accuracy of determining the angular location of the identified UE. Alternatively, when the physical proximity of the identified UE to a pair of antennas is outside the range, non-filtered sampled data may be employed to determine the angular location of the identified UE. In this way, consumption of computational resources and energy resources are decreased when an improvement in accuracy is likely to be negligible by using extracted sampled data representing direct path uplink wireless RF signals to determine the angular location of an identified UE. In one or more embodiments, the range of may be predetermined, static, or dynamically determined to improve the accuracy of determining the angular location of the identified UE.

In one or more embodiments the frequencies and waveforms of the uplink and downlink wireless RF signals may be associated with 4G wireless RF signals, 5G wireless RF signals, and the like.

In one or more embodiments, the improved accuracy is provided, in part, by filtering the sampled data generated by synchronously sampling uplink wireless RF signals monitored by a pair of antennas. The filtering of the synchronously sampled data cancels multipath uplink wireless RF signals and extracts direct path uplink wireless RF signals that are subsequently used to accurately determine the angular location of an identified UE communicating uplink wireless RF signals with a remotely located base station. Alternatively, in one or more embodiments, the sampling of uplink wireless RF signals may be asynchronous.

In one or more embodiments, an integrated system may be provided that includes an Angle of Arrival detector (that includes one or more pairs of antennas in an M×N array of antennas) to accurately identify each UE's angular location, a protocol decoder to sniff the base station downlink channel and decode the transmit and receive schedule for each UE, and a beam manager to apply this information to effect an appropriate schedule for a holographic beam forming antenna to communicate a beam of downlink wireless RF signals to the identified UE at the angular location.

Illustrated Operating Environment

The data rates of legacy 4G data systems have been limited by the relatively low directivity of sector antennas. However, the introduction of 5G data systems is providing an opportunity for higher directivities with millimeter waveforms communicated by holographic beam forming (HBF) antennas, which can provide significantly higher data rates to an identified UE by dynamically pointing to the angular location of the UE as needed. The success of the pointing relies upon accurate knowledge of the actual angular location, e.g., azimuth and elevation, of an identified UE relative to the HBF antenna. In one or more of the various embodiments, an HBF system employs an Angle of Arrival detector to more accurately determine each identified UE's angular location based on a portion of sampled data that represents extracted direct path uplink wireless RF signals with as few as one pair of antennas monitoring uplink wireless RF signals.

FIG. 1A illustrates one embodiment of a holographic metasurface antenna (HMA) which takes the form of a surface scattering antenna 100 that includes multiple scattering elements 102a, 102b that are distributed along a wave-propagating structure 104 or other arrangement through which a reference wave 105 can be delivered to the scattering elements. The wave propagating structure 104 may be, for example, a microstrip, a coplanar waveguide, a parallel plate waveguide, a dielectric rod or slab, a closed or tubular waveguide, a substrate-integrated waveguide, or any other structure capable of supporting the propagation of a reference wave 105 along or within the structure. A reference wave 105 is input to the wave-propagating structure 104. The scattering elements 102a, 102b may include scattering elements that are embedded within, positioned on a surface of, or positioned within an evanescent proximity of, the wave-propagation structure 104. Examples of such scattering elements include, but are not limited to, those disclosed in U.S. Pat. Nos. 9,385,435; 9,450,310; 9,711,852; 9,806,414; 9,806,415; 9,806,416; and 9,812,779 and U.S. Patent Applications Publication Nos. 2017/0127295; 2017/0155193; and 2017/0187123, all of which are incorporated herein by reference in their entirety. Also, any other suitable types or arrangement of scattering elements can be used.

The surface scattering antenna may also include at least one feed connector 106 that is configured to couple the wave-propagation structure 104 to a feed structure 108 which is coupled to a reference wave source (not shown). The feed structure 108 may be a transmission line, a waveguide, or any other structure capable of providing an electromagnetic signal that may be launched, via the feed connector 106, into the wave-propagating structure 104. The feed connector 106 may be, for example, a coaxial-to-microstrip connector (e.g. an SMA-to-PCB adapter), a coaxial-to-waveguide connector, a mode-matched transition section, etc.

The scattering elements 102a, 102b are adjustable scattering elements having electromagnetic properties that are adjustable in response to one or more external inputs. Adjustable scattering elements can include elements that are adjustable in response to voltage inputs (e.g. bias voltages for active elements (such as varactors, transistors, diodes) or for elements that incorporate tunable dielectric materials (such as ferroelectrics or liquid crystals)), current inputs (e.g. direct injection of charge carriers into active elements), optical inputs (e.g. illumination of a photoactive material), field inputs (e.g. magnetic fields for elements that include nonlinear magnetic materials), mechanical inputs (e.g. MEMS, actuators, hydraulics), or the like. In the schematic example of FIG. 1A, scattering elements that have been adjusted to a first state having first electromagnetic properties are depicted as the first elements 102a, while scattering elements that have been adjusted to a second state having second electromagnetic properties are depicted as the second elements 102b. The depiction of scattering elements having first and second states corresponding to first and second electromagnetic properties is not intended to be limiting: embodiments may provide scattering elements that are discretely adjustable to select from a discrete plurality of states corresponding to a discrete plurality of different electromagnetic properties, or continuously adjustable to select from a continuum of states corresponding to a continuum of different electromagnetic properties.

In the example of FIG. 1A, the scattering elements 102a, 102b have first and second couplings to the reference wave 105 that are functions of the first and second electromagnetic properties, respectively. For example, the first and second couplings may be first and second polarizabilities of the scattering elements at the frequency or frequency band of the reference wave. On account of the first and second couplings, the first and second scattering elements 102a, 102b are responsive to the reference wave 105 to produce a plurality of scattered electromagnetic waves having amplitudes that are functions of (e.g. are proportional to) the respective first and second couplings. A superposition of the scattered electromagnetic waves comprises an electromagnetic wave that is depicted, in this example, as an object wave 110 that radiates from the surface scattering antenna 100.

FIG. 1A illustrates a one-dimensional array of scattering elements 102a, 102b. It will be understood that two- or three-dimensional arrays can also be used. In addition, these arrays can have different shapes. Moreover, the array illustrated in FIG. 1A is a regular array of scattering elements 102a, 102b with equidistant spacing between adjacent scattering elements, but it will be understood that other arrays may be irregular or may have different or variable spacing between adjacent scattering elements. Also, Application Specific Integrated Circuit (ASIC)109 is employed to control the operation of the row of scattering elements 102a and 102b. Further, controller 110 may be employed to control the operation of one or more ASICs that control one or more rows in the array.

Figure 1B:
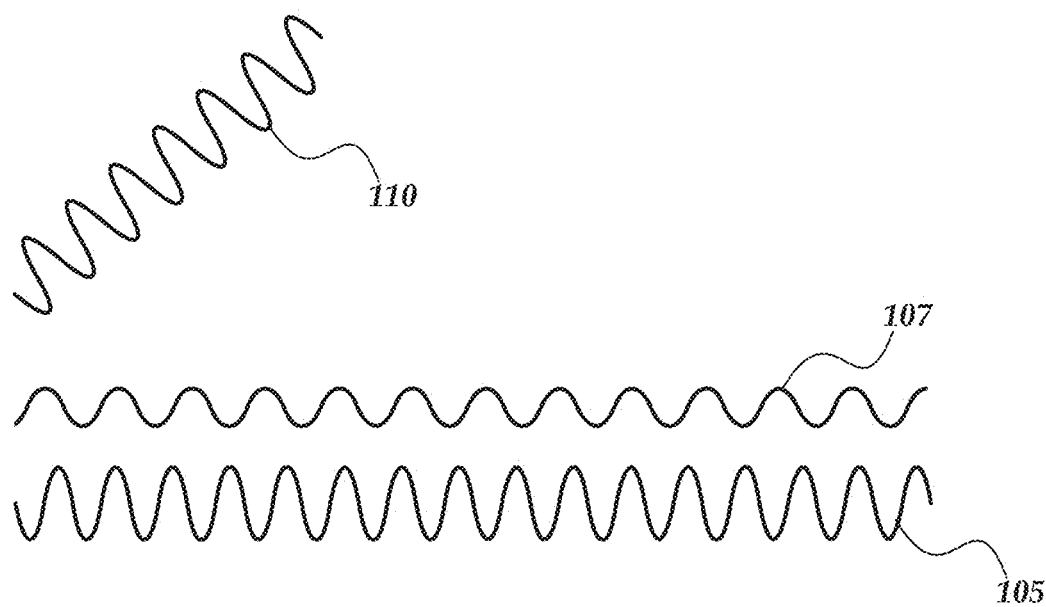
FIG. 1B shows a representation of one embodiment of a synthetic array illustrating a reference waveform and a hologram waveform (modulation function) that in combination provide an object waveform of electromagnetic waves.
Figure 1C:
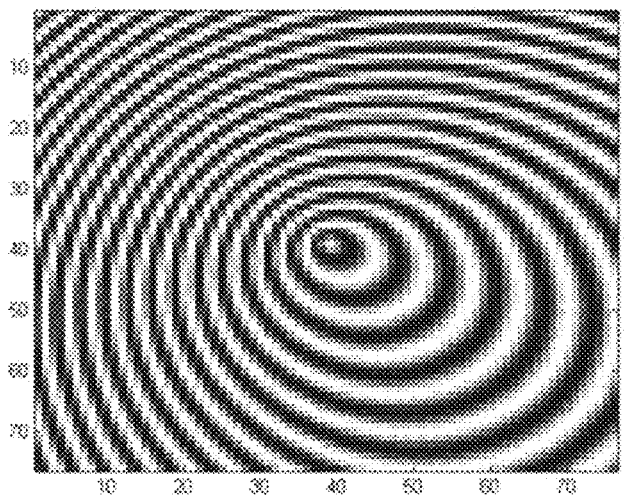
FIG. 1C shows an embodiment of an exemplary modulation function for an exemplary surface scattering antenna.
Figure 1D:
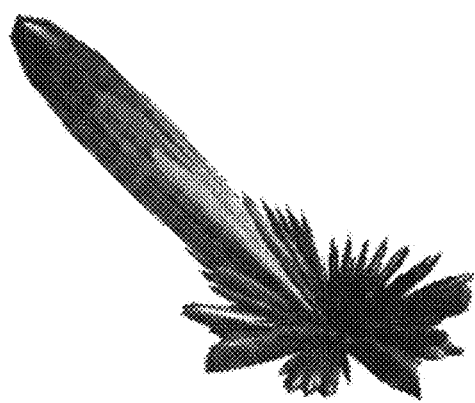
FIG. 1D shows an embodiment of an exemplary beam of electromagnetic waves generated by the modulation function of FIG. 1C.

The array of scattering elements 102a, 102b can be used to produce a far-field beam pattern that at least approximates a desired beam pattern by applying a modulation pattern 107 (e.g., a hologram function, H) to the scattering elements receiving the reference wave ($\psi_{ref}$) 105 from a reference wave source, as illustrated in FIG. 1B. Although the modulation pattern or hologram function 107 in FIG. 1B is illustrated as sinusoidal, it will be recognized non-sinusoidal functions (including non-repeating or irregular functions) may also be used. FIG. 1C illustrates one example of a modulation pattern and FIG. 1D illustrates one example of a beam generated using that modulation pattern.

In at least some embodiments, a computing system can calculate, select (for example, from a look-up table or database of modulation patterns) or otherwise determine the modulation pattern to apply to the scattering elements 102a, 102b receiving the RF energy that will result in an approximation of desired beam pattern. In at least some embodiments, a field description of a desired far-field beam pattern is provided and, using a transfer function of free space or any other suitable function, an object wave ($\psi_{obj}$) 110 at an antenna's aperture plane can be determined that results in the desired far-field beam pattern being radiated. The modulation function (e.g., hologram function) can be determined which will scatter the reference wave 105 into the object wave 110. The modulation function (e.g., hologram function) is applied to scattering elements 102a, 102b, which are excited by the reference wave 105, to form an approximation of an object wave 110 which in turn radiates from the aperture plane to at least approximately produce the desired far-field beam pattern.

In at least some embodiments, the hologram function H (i.e., the modulation function) is equal the complex conjugate of the reference wave and the object wave, i.e., $\psi_{ref}^*\psi_{obj}$. In at least some embodiments, the surface scattering antenna may be adjusted to provide, for example, a selected beam direction (e.g. beam steering), a selected beam width or shape (e.g. a fan or pencil beam having a broad or narrow beam width), a selected arrangement of nulls (e.g. null steering), a selected arrangement of multiple beams, a selected polarization state (e.g. linear, circular, or elliptical polarization), a selected overall phase, or any combination thereof. Alternatively, or additionally, embodiments of the surface scattering antenna may be adjusted to provide a selected near field radiation profile, e.g. to provide near-field focusing or near-field nulls.

The surface scattering antenna can be considered a holographic beamformer which, at least in some embodiments, is dynamically adjustable to produce a far-field radiation pattern or beam. In some embodiments, the surface scattering antenna includes a substantially one-dimensional wave-propagating structure 104 having a substantially one-dimensional arrangement of scattering elements. In other embodiments, the surface scattering antenna includes a substantially two-dimensional wave-propagating structure 104 having a substantially two-dimensional arrangement of scattering elements. In at least some embodiments, the array of scattering elements 102a, 102b can be used to generate a narrow, directional far-field beam pattern, as illustrated, for example, in FIG. 1C. It will be understood that beams with other shapes can also be generated using the array of scattering elements 102a, 102b.

In at least some of the embodiments, the narrow far-field beam pattern can be generated using a holographic metasurface antenna (HMA) and may have a width that is 5 to 20 degrees in extent. The width of the beam pattern can be determined as the broadest extent of the beam or can be defined at a particular region of the beam, such as the width at 3 dB attenuation. Any other suitable method or definition for determining width can be used.

A wider beam pattern (also referred to as a "radiation pattern") is desirable in a number of applications, but the achievable width may be limited by, or otherwise not available using, a single HMA. Multiple instances of HMAs can be positioned in an array of HMAs to produce a wider composite far-field beam pattern. It will be recognized, however, that the individual beam patterns from the individual HMAs will often interact and change the composite far-field beam pattern so that, at least in some instances, without employing the one or more embodiments of the invention, the simple combination of the outputs of multiple instances of HMAs produces a composite far-field beam pattern that does not achieve the desired or intended configuration.

Figure 1E:
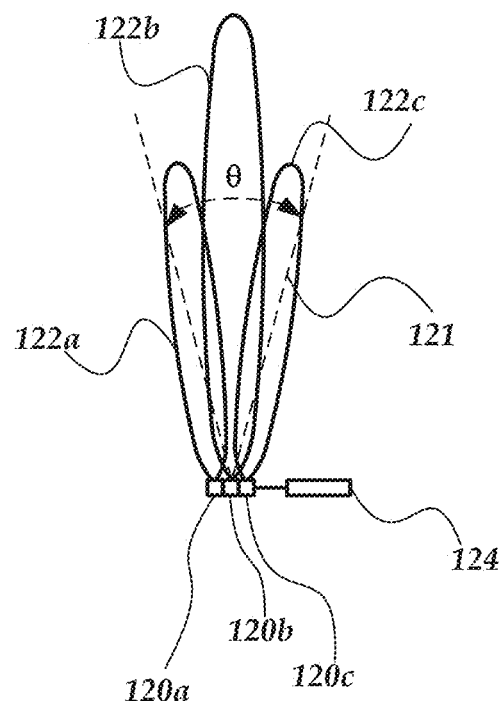
FIG. 1E shows a side view of another embodiment of an exemplary arrangement of multiple instances of HMAs.
Figure 1F:
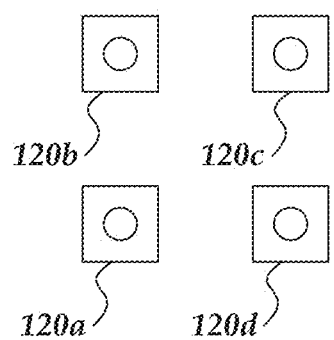
FIG. 1F shows a top view of yet another embodiment of an exemplary arrangement of multiple instances of HMAs.

FIG. 1E illustrates an arrangement of HMAs 120a, 120b, 120c that produce beams 122a, 122b, 122c where the middle beam 122b is substantially different in size and shape from the other two beams 122a, 122c. FIG. 1F illustrates, in a top view, yet another arrangement of HMAs 120a, 120b, 120c, 120d which form a two-dimensional array.

Also, one or more particular shapes of beam patterns, such as wide beam patterns, narrow beam patterns or composite beam patterns, may be desirable in a number of applications at different times for different conditions, but may not be practical or even available using a single HMA.

In one or more embodiments, multiple instances of HMAs may be positioned in an array to produce a wide variety of composite, near-field, and/or far-field beam patterns without significant cancellation or signal loss. Since the object waves of multiple instances of HMAs may interfere with each other, adjustment to their object waves may be desirable to generate a beam pattern "closer" to the desired shape of a particular beam pattern. Any suitable methodology or metric can be used to determine the "closeness" of a beam pattern to a desired beam pattern including, but not limited to, an average deviation (or total deviation or sum of the magnitudes of deviation) over the entire beam pattern or a defined portion of the beam pattern from the desired beam pattern or the like.

In one of more embodiments, a physical arrangement of HMAs may be existing or can be constructed and coupled to a reference wave source. In one or more embodiments, a hologram function can be calculated, selected, or otherwise provided or determined for each of the HMAs. Each of the HMAs includes an array of dynamically adjustable scattering elements that have an adjustable electromagnetic response to a reference wave from the reference wave source. The hologram function for the HMA defines adjustments of the electromagnetic responses for the scattering elements of the HMA to produce an object wave that is emitted from the HMA in response to the reference wave. The object waves produced by the HMAs may be combined to produce a composite beam. Any suitable method or technique can be used to determine or provide any arrangement of HMAs to produce a composite beam, such as the exemplary composite beams illustrated in FIGS. 1E and 1F.

Figure 2A:
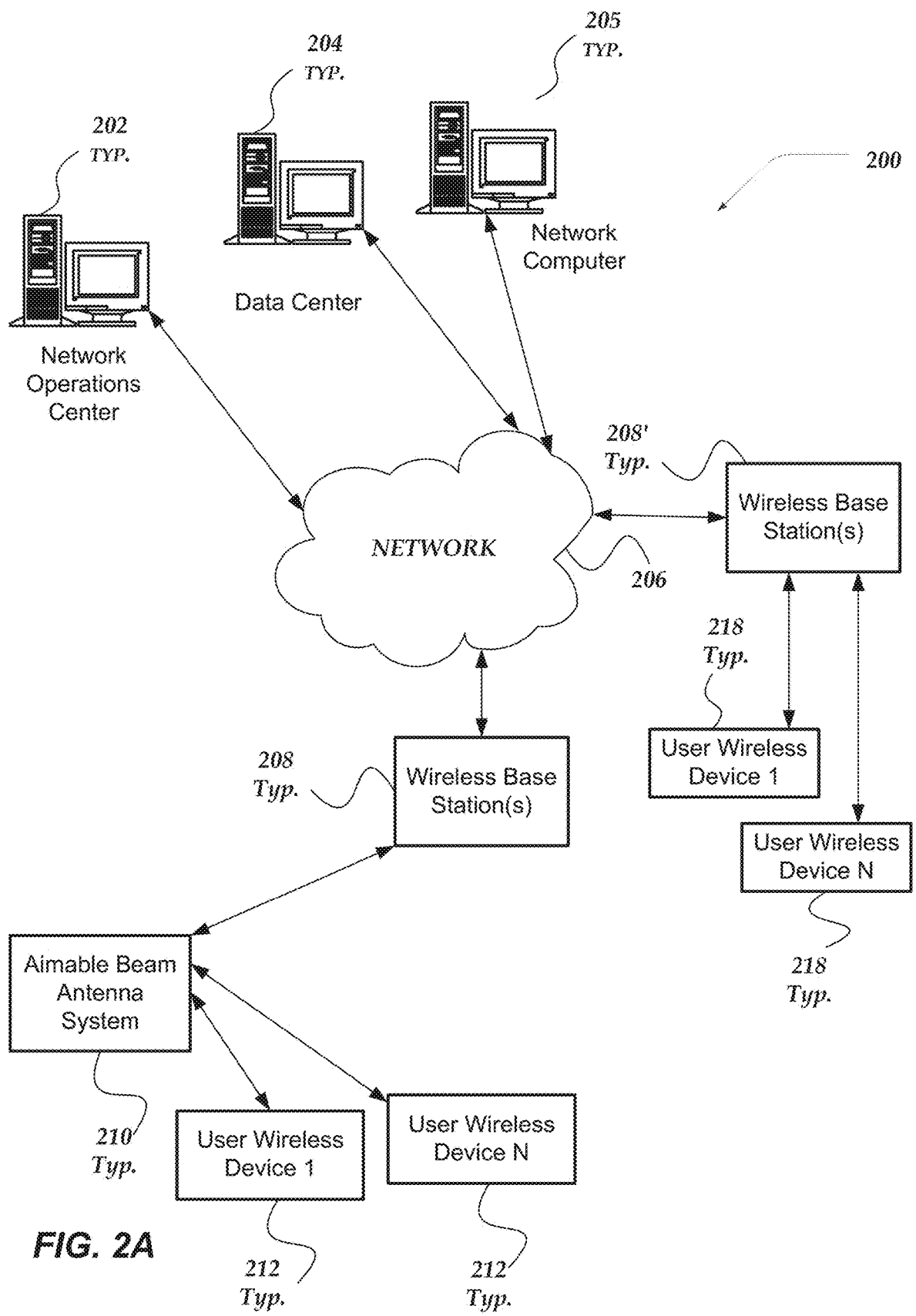
FIG. 2A shows a top view of an embodiment of an exemplary environment, including an arrangement of a network operations center, wireless RF signal base station, network and multiple wireless user devices, in which various embodiments of the invention may be implemented.

As shown in FIG. 2A, an overview of system 200 is illustrated for communicating data from one or more data centers 204 which employs one or more network operations centers 202 to route the data to one or more remote wireless base stations 208 that communicate the data in the form of RF wireless signals to one or more user wireless devices (UEs) 212 and 218. As shown, the data is communicated from one or more data centers 204 and routed in part by one or more NOCs 202 over network 206 to a plurality of remote wireless base stations 208' that wirelessly communicate the data directly with one or more UEs 218, or a plurality of remote wireless base stations 208 that employ one or Aimable Beam Antenna Systems 210 (ABAS) to multiplex communication with UEs 212. One or more user wireless devices (UEs) 212 are in communication with ABAS 210 which is arranged to multiplex communication of one or more of downlink wireless signals or uplink wireless signals communicated between wireless base station 208 and one or more identified UEs 212. Also, one or more network computers 205 may execute an app that provides remote analysis and control of the one or more ABAS 210. Although not shown, wireless base station 208 may also communicate directly with one or more UEs, while also multiplexing communication through ABAS 210 with the same or other UEs.

Although not shown, ABAS 210 may be a separate device that employs an interface to directly communicate wireless signals with base station 208 through a physical connection, such as a coaxial fiber cable, waveguide, or other type of cable capable of communicating at least uplink and downlink wireless signals between the ABAS and the base station.

Network 206 may be configured to couple network operation center computers with other computing devices, including wireless base station 208. Network 206 may include various wired and/or wireless technologies for communicating with a remote device, such as, but not limited to, USB cable, Bluetooth®, Wi-Fi®, or the like. In some embodiments, network 206 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 206 may be enabled to employ various forms of communication technology, topology, computer-readable media, or the like, for communicating information from one electronic device to another. For example, network 206 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 206 may include various communication technologies by which information may travel between computing devices.

Network 206 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least one wireless communication device. Such sub-networks may include mesh networks, Wireless LAN (WLAN) networks, cellular networks, or the like. In one or more of the various embodiments, the system may include more than one wireless network.

Network 206 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), 5G New Radio (5G NR), 5G Technical Forum (5G TF), 5G Special Interest Group (5G SIG), Narrow Band Internet of Things (NB IoT), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies.

In various embodiments, at least a portion of network 206 may be arranged as an autonomous system of nodes, links, paths, terminals, gateways, routers, switches, firewalls, load balancers, forwarders, repeaters, optical-electrical converters, base stations, or the like, which may be connected by various communication links. These autonomous systems may be configured to self-organize based on current operating conditions and/or rule-based policies, such that the network topology of the network may be modified.

Figure 2B:
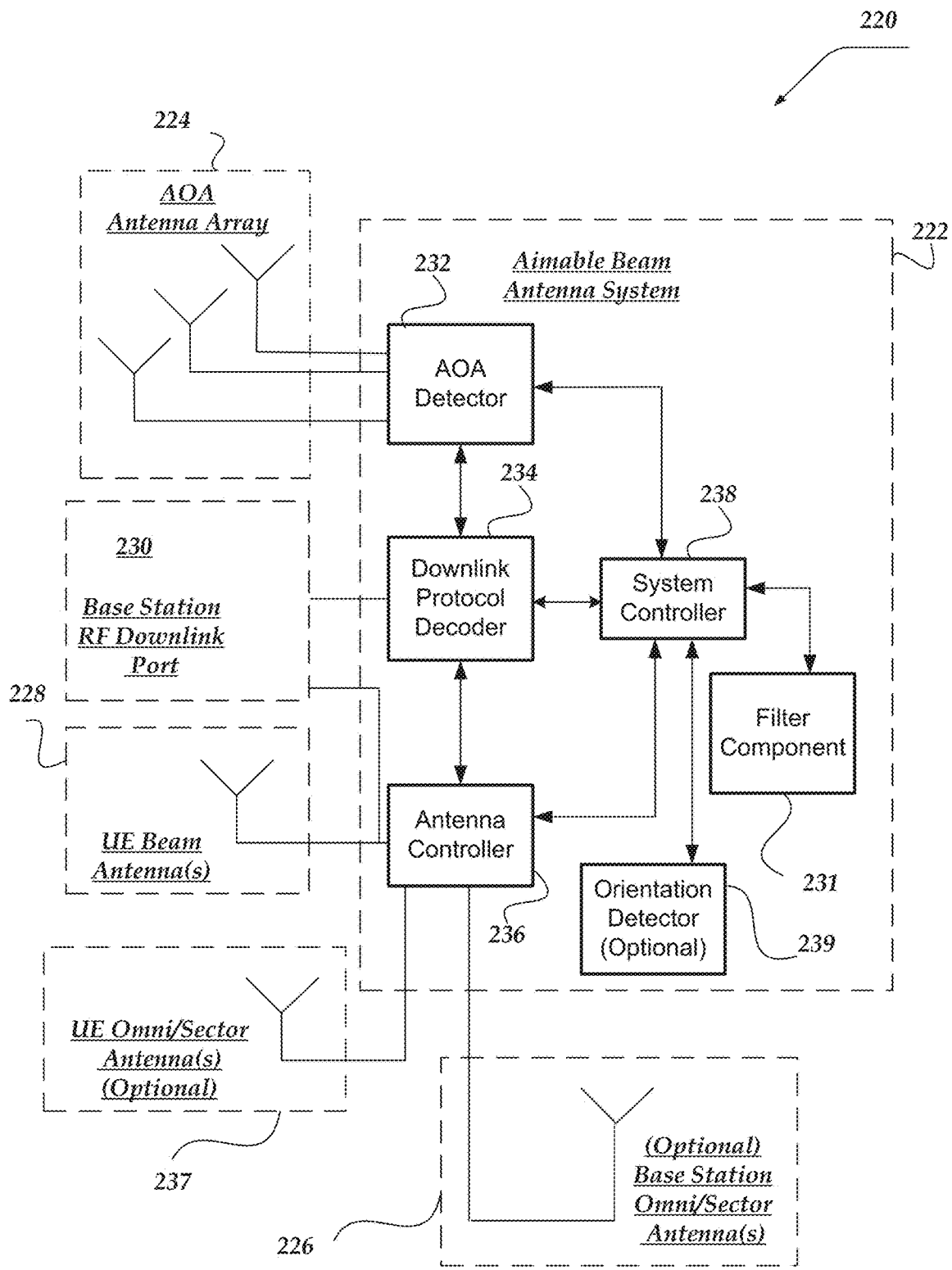
FIG. 2B shows an exemplary embodiment of an aimable beam antenna system that is remotely located from a wireless base station.

FIG. 2B illustrates an exemplary schematic overview 220 of aimable beam antenna system (ABAS) 222, which is coupled to Angle of Arrival (AoA) antenna array component 224, one or more optional base station omnidirectional/sector directional antenna components 226, one or more optional UE omnidirectional/sector directional antenna components 237, one or more UE beam antenna components 228, and one or more radio frequency RF inputs (not shown) connected to one or more base station radio frequency (RF) downlink ports 230. In one or more embodiments, a physical connection between the one or more RF inputs and the one or more base station downlink RF ports 230 is provided by one of a coaxial fiber cable, a waveguide, or another conductive component that is arranged to communicate downlink RF signals between ABAS 222 and the base station.

ABAS 222 includes system controller 238 which manages the operation of several components, including AoA detector component 232, downlink protocol decoder component 234, antenna controller 236, and optional orientation detector component 239. AoA detector component 232 is coupled to AoA array antennas component 224.

As shown, AoA detector component 232 is arranged to employ AoA antenna array 224 to determine an azimuth and an elevation that best fits uplink wireless RF signals communicated to a base station by remotely located UEs. Also, AoA detector component 232 may use a schedule provided by downlink protocol decoder component 234 to sort, in time and frequency, digitized data corresponding to the wave forms of each of the received uplink wireless RF signals so that the data received from each UE can be processed independently and separately identify each UE that is communicating with the base station at a scheduled time. AoA detector component 232 provides a table of identifiers for each UE along with their azimuths and elevations relative to AoA antenna array 234, which is associated with the schedule provided by the downlink protocol decoder component. Additionally, filter component 231 is employed to filter out reflections of uplink wireless RF signals to improve accuracy in determining the azimuth and elevations of each UE.

Component 231 enables improved accuracy by time shifting cross correlated data samples of uplink signals received by a minimum number of antennas utilized by AoA antenna array 224, e.g., two antennas.

As shown, downlink protocol decoder component 234 employs downlink RF signals communicated by the base station through one or more RF inputs that are connected to one or more base station RF downlink ports 230 to determine the schedule employed by the base station to communicate with a plurality of identified UEs. Downlink protocol decoder component 234 monitors the downlink RF signals for control information by decoding its corresponding one or more wireless communication protocols, which in some circumstances may include a 4G protocol such as Long Term Evolution (LTE).

Additionally, an exemplary decoding process employed by downlink protocol decoder component 234 for the LTE protocol includes at least in part as follows: (1) synching to the primary and secondary synchronization signals to determine a cellular ID and time for synching for each UE; (2) decode a Management Information Database (MIB) to determine the bandwidth of the base station's communication with the UE; (3) extract Physical Control Format Indicator Channel (PCFICH) to determine control region numerology that is used in the Physical Downlink Control Channel (PDCCH); (4) blind decode each possible PDCCH to identify the scheduling information; and (5) employ the physical download shared channel (PDSCH) information to decode a system information block that is used to determine the uplink bandwidth. The result of the decoding process for the LTE protocol is determining a schedule that identifies a time and a frequency allocation for each UE for transmitting and receiving wireless RF signals with the base station. In this way, downlink protocol decoder component 234 is able to provide the determined schedule to AoA detector component 232 and antenna controller component 236. Additionally, a similar decoding process, albeit different in some ways, may be employed to decode other wireless communication protocols, such as other 4G protocols and/or 5G protocols.

As shown, downlink protocol decoder component 234 employs an RF input (not shown) connected to base station RF downlink port 230 to monitor downlink RF signals for control information broadcast by the base station. In one or more embodiments, the control information is not encrypted or encoded. Further, in one or more embodiments, downlink protocol decoder component 234 does not decrypt or read user data communicated between the base station and one or more UEs. Further, in one or more embodiments, a wireless service provider or carrier that controls the base station may not know a location of each identified UE that is in communication with the base station. Also, the control information may include a schedule for the base station that allocates a time period when each identified UE is enabled for communication of wireless signals (uplink and downlink) with the base station.

Furthermore, downlink protocol decoder component 234 may provide additional information regarding one or more of the identified UEs in communication with the base station to the carrier which controls the base station or another carrier for different purposes, including emergency services, security services, advertising or marketing. The provided information may include one or more of azimuth, elevation, carrier, or a determined location of one or more identified UEs, or a strength of wireless signals communicated between the UE and a beam antenna operated by antenna controller component 236.

In one or more embodiments, antenna controller component 236 generates a pointing schedule based on a combination of the allocation schedule provided by downlink protocol decoder component 234 and the table provided by AoA detector component 232. The pointing schedule includes the azimuth, elevation, and time schedule for transmitting and receiving wireless signals with each UE identified to be in communication with the base station. In one or more embodiments, the pointing schedule may also include a strength of uplink wireless signals communicated by identified UEs, and one or more waveforms employed by a beam forming antenna to radiate a beam of wireless signals in the direction of each identified UE.

Also, in one or more embodiments, antenna controller component 236 may employ the one or more waveforms to configure UE beam forming antenna 228 to generate a beam of wireless downlink RF signals broadcast by the base station at a scheduled time in the direction defined by the azimuth and elevation corresponding to each identified UE listed in the pointing schedule. Additionally, in one or more embodiments, antenna controller component 236 may provide a gain for the beam of wireless downlink RF signals radiated in the direction of an identified UE based on a strength of uplink wireless RF signals from identified UEs that are monitored by AoA detector component 232 with AoA antenna array 224.

Additionally, in one or more embodiments, the antenna controller component 236 may receive downlink wireless RF signals communicated by the base station for each identified UE on the schedule with one or more of the optional omnidirectional/sector directional base station antennas 226. In this way, ABAS 222 may employ base station antennas 226 to receive the downlink RF signals wirelessly transmitted by one or more types of antennas (not shown) employed by the base station (not shown). Further, the received downlink RF signals may be retransmitted as a beam waveform that is radiated in the direction of each identified UE at the corresponding time periods allocated in the pointing schedule. Also, the antenna controller 236 can receive downlink RF signals communicated in 5G or 4G protocols from the base station, and then multiplex the retransmission of the received downlink RF signals to each identified UE. Additionally, in one or more embodiments, UE beam antenna 228 may include one or more a holographic beam forming (HBF) antenna, a parabolic antenna, a spherical antenna, a helical antenna, a yagi antenna, a horn antenna, a phased array antenna, or the like.

As shown, optional orientation detector component 239 may be employed to identify a physical position of the ABAS 222 generally, and more specifically the orientation and physical position of UE beam antenna 228. Although not shown, orientation detector component 239 may include one or more of an accelerometer, gyroscope, compass, altimeter, or a global positioning system (GPS) component.

Additionally, as shown, system controller component 238 is in communication with AoA detector component 232, downlink protocol decoder component 234, antenna controller component 236, and optional orientation detector component 239. System controller component 238 is employed to manage and coordinate the operation of the other components. Also, in one or more embodiments, system controller component 238 is employed to communicate with one or more network computers (not shown) that are employed to remotely manage the operation of ABAS 222.

Also, the system controller component 238 may provide information regarding one or more of the identified UEs or non-identified UEs to one or more of carriers, organizations, or other entities, for different uses, e.g., emergency services, security services, advertising or marketing. The provided information may include one or more of azimuth, elevation, carrier associated with a UE, or strength of wireless RF signals communicated between the UE and the antenna controller component. Also, the provided information may include a determined location of a UE.

Additionally, in one or more embodiments (not shown in the figures), system controller component 238 may include one or more processor devices, or embedded logic hardware devices, such as, an Application Specific Integrated Circuits (ASICs), Field Programmable Gate Arrays (FPGAs), Programmable Array Logics (PALs), or the like, or combination thereof. The one or more processor devices or embedded logic hardware devices may directly execute one or more of embedded logic or logic stored in a memory to perform actions to manage the operation of other components. Also, in one or more embodiments (not shown in the figures), system controller component 238 may include one or more hardware microcontrollers instead of processor devices. In one or more embodiments, the one or more microcontrollers may directly execute their own embedded logic or logic stored in memory to perform actions and access their own internal memory and their own external Input and Output Interfaces (e.g., hardware pins and/or wireless transceivers) to perform actions, such as System On a Chip (SOC), or the like.

Additionally, in one or more embodiments, antenna controller component 236 may employ two or more waveforms to configure UE beam forming antenna component 228 to generate two or more separate beams at the scheduled time in different directions defined by two or more azimuth and elevation coordinate pairs that correspond to two or more identified UE listed in the pointing schedule and allocated a time period to communicate with the base station.

Further, in one or more embodiments, antenna controller component 236 may employ two or more waveforms to configure two or more separate UE beam forming antennas 228 to generate two or more separate beams at the scheduled time in different directions defined by two or more azimuth and elevation coordinate pairs that correspond to two or more identified UE listed in the pointing schedule and allocated a time period to communicate with the base station.

Moreover, in one or more embodiments, antenna controller component 236 may facilitate an arrangement of a two to one Multiple Inputs Multiple Outputs (MIMO) antenna by using both UE beam forming antenna 228 and optional UE omnidirectional/sector directional antenna 237 to provide communication with an identified UE during allocated time periods in the pointing schedule. In one or more embodiments, antenna controller component 236 may employ these two antennas to determine which antenna is able to provide the optimal, e.g., best bandwidth with the lowest latency to communicate downlink RF signals to an identified UE. Once the optimal determination is made for the identified UE, antenna controller component 236 may use the determined antenna for further communication of downlink RF signals with the UE.

Further, in one or more embodiments, antenna controller component 236 may employ both UE beam forming antenna 228 and optional omnidirectional/sector directional antenna 237 to simultaneously provide communication of wireless downlink RF signals to at least two different identified UEs that are simultaneously allocated time periods in the pointing schedule for communication with the base station. Also, antenna controller component 236 may be arranged to employ one or more policies to determined which of these two antennas provides simultaneous communication with each of the at least two UEs. For example, a policy may prioritize communication by UE beam forming antenna 228 with a preselected UE, or the first UE to respond to wireless control signals, when simultaneous communication with two or more UEs occurs. Based on the policy, one UE may communicate via UE beam forming antenna 228 and the other UE would communicate via optional UE omnidirectional/sector directional antenna 237. Also, in one or more embodiments, antenna controller component 236 may provide one or more waveforms to the beam forming antenna to cause radiation of wireless downlink RF signals omnidirectionally instead of in a shaped beam for one or more identified UEs during an allocated time period on the pointing schedule.

Figure 2C:
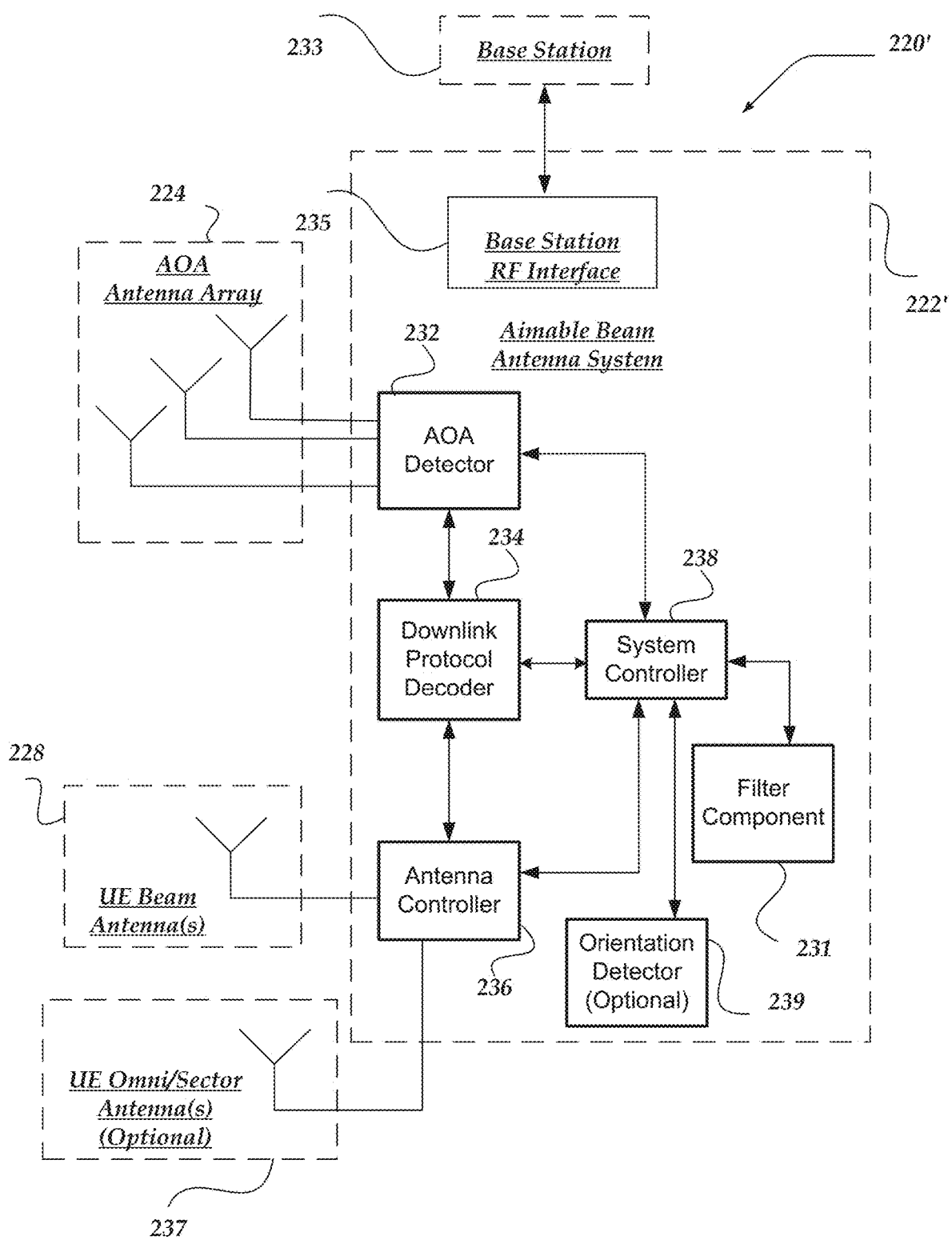
FIG. 2C shows an exemplary embodiment of an aimable beam antenna system that provides an interface to directly couple RF signal communicated by a separate wireless base station.

FIG. 2C illustrates an exemplary schematic overview 220' of aimable beam antenna system (ABAS) 222', which is coupled to Angle of Arrival (AoA) antenna array component 224, one or more optional UE omnidirectional/sector directional antenna component 237, one or more UE beam antenna component 228, and base station 233.

ABAS 222' includes system controller 238 which manages the operation of several components, including AoA detector component 232, downlink protocol decoder component 234, filter component 231, antenna controller 236, base station radio frequency (RF) interface component 235 and optional orientation detector component 239. Also, AoA detector component 232 is coupled to AoA array antennas component 224.

In this arrangement, ABAS 222' is directly coupled to RF signals communicated by base station 233 through base station interface 235, and operates substantially similar to ABAS 222, albeit somewhat differently. In one or more embodiments, wireless downlink RF signals directly monitored over base station interface 235 are used to determine the schedule for multiplexing communication of downlink RF signals with identified UEs. Further, interface 235 is arranged to directly communicate RF signals with the base station through a direct coupling of the base station RF interface 235 of ABAS 222' to base station 233.

Figure 2D:
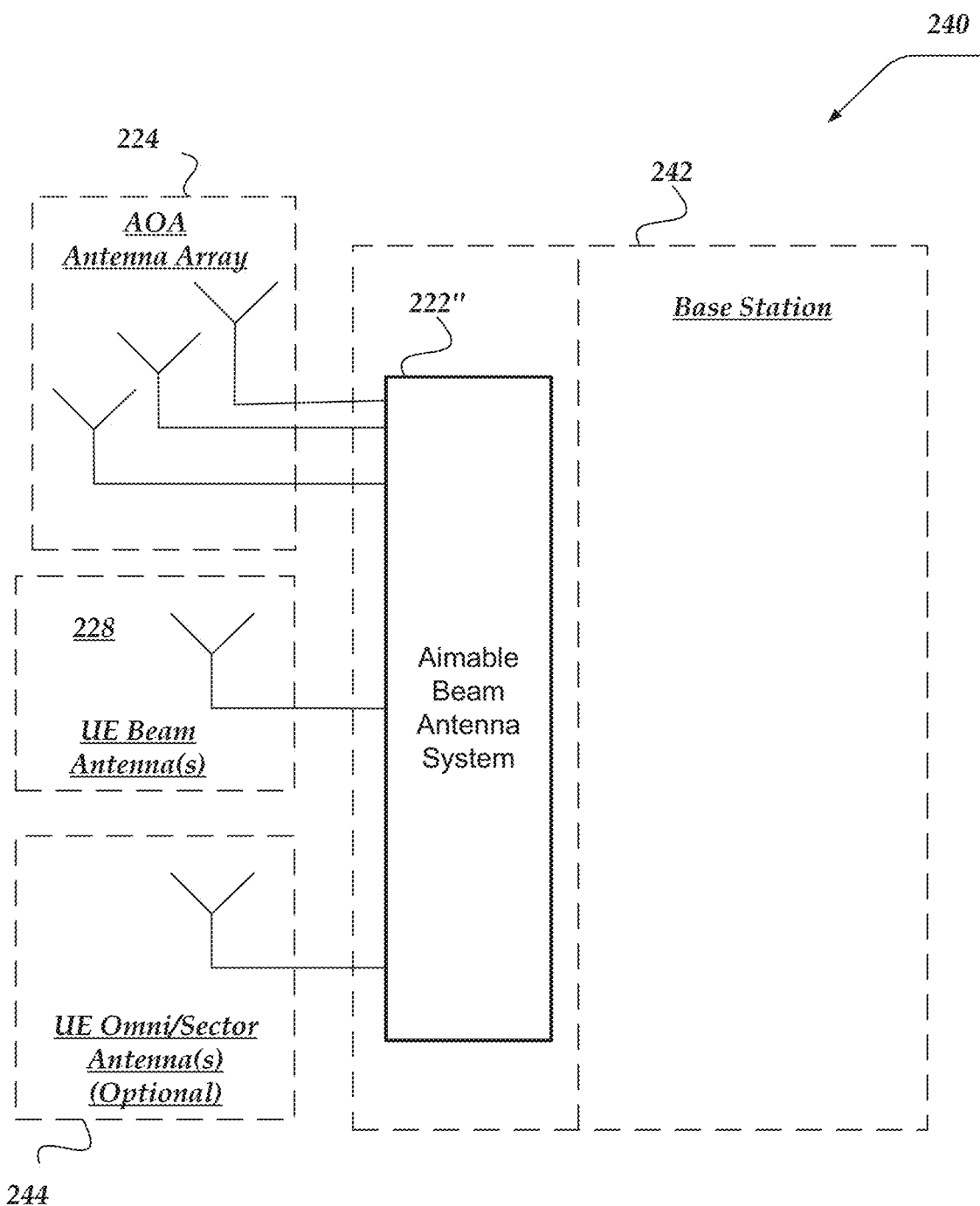
FIG. 2D shows an exemplary embodiment of an aimable beam antenna system that is integrated with a wireless base station.

FIG. 2D illustrates a schematic overview 240 of an aimable beam antenna system (ABAS) 222" that is integrated with base station 242 and operates substantially similar to ABAS 222 and/or 222', albeit somewhat differently. Also, as shown, ABAS 222" is coupled to AoA antenna array component 224, one or more UE beam antenna components 228, and one or more optional UE Omni/Sector Antenna components 244.

In one or more embodiments, an antenna controller component and the AoA component (neither shown) of ABAS 222" is provided the schedule for multiplexing communication with identified UEs directly from the base station instead of employing a separate download decoder protocol component to determine and the schedule by monitoring downlink RF signals.

Illustrative Network Computer

Figure 3:
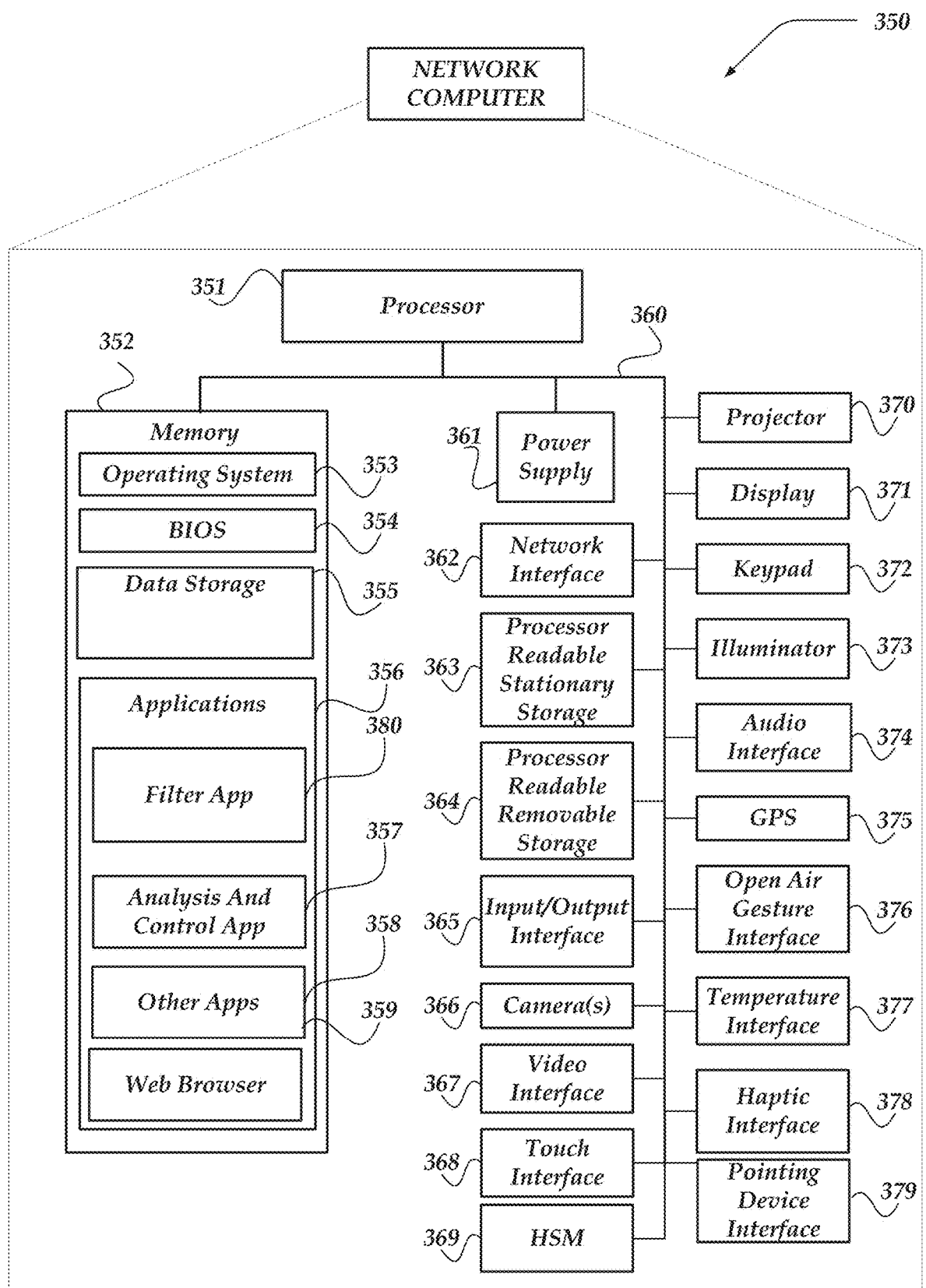
FIG. 3 shows an embodiment of an exemplary network computer device that may be included in a system such as that shown in FIG. 2A.

FIG. 3 shows one embodiment of network computer 350 that may include many more, or less, components than those shown. Network computer 350 may represent, for example, at least one embodiment of a computing employed by a network operations center, data center, server, mobile device, user wireless device, or client device as shown in FIG. 2A.

Network computer 350 may include processor 351 in communication with memory 352 via bus 360. Network computer 350 may also include power supply 361, network interface 362, audio interface 374, display 371, keypad 372, illuminator 373, video interface 367, input/output interface 365, haptic interface 378, global positioning systems (GPS) receiver 375, open air gesture interface 376, temperature interface 377, camera(s) 367, projector 370, pointing device interface 379, processor-readable stationary storage device 363, and processor-readable removable storage device 364. Network computer 350 may optionally communicate with a base station (not shown), an Aimable Beam Antenna System (not shown) or directly with another computer. Power supply 361 may provide power to network computer 350. A rechargeable or non-rechargeable battery may be used to provide power. The power may also be provided by an external power source, such as an AC adapter or a powered docking cradle that supplements or recharges the battery.

Network interface 362 includes circuitry for coupling network computer 350 to one or more networks, and it is constructed for use with one or more wired and/or wireless communication protocols and technologies. Examples of various generations (e.g., third (3G), fourth (4G), or fifth (5G)) of communication protocols and/or technologies may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), 5G New Radio (5G NR), 5G Technical Forum (5G TF), 5G Special Interest Group (5G SIG), Narrow Band Internet of Things (NB IoT), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies.

Audio interface 374 may be arranged to produce and receive audio signals such as the sound of a human voice. For example, audio interface 374 may be coupled to a speaker and microphone (not shown) to enable telecommunication with others or generate an audio acknowledgement for some action. A microphone in audio interface 374 can also be used for input to or control of network computer 350, e.g., using voice recognition, detecting touch based on sound, and the like.

Display 371 may be a liquid crystal display (LCD), gas plasma, electronic ink, light emitting diode (LED), Organic LED (OLED) or any other type of light reflective or light transmissive display that can be used with a computer. Display 371 may also include a touch interface 368 arranged to receive input from an object such as a stylus or a digit from a human hand, and may use resistive, capacitive, surface acoustic wave (SAW), infrared, radar, or other technologies to sense touch or gestures.

Projector 370 may be a remote handheld projector or an integrated projector that is capable of projecting an image on a remote wall or any other reflective object such as a remote screen.

Video interface 367 may be arranged to capture video images, such as a still photo, a video segment, an infrared video, or the like. For example, video interface 367 may be coupled to a digital video camera, a web-camera, or the like. Video interface 367 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 372 may comprise any input device arranged to receive input from a user. For example, keypad 372 may include a push button numeric dial, or a keyboard. Keypad 372 may also include command buttons that are associated with selecting and sending images.

Illuminator 373 may provide a status indication or provide light. Illuminator 373 may remain active for specific periods of time or in response to event messages. For example, when illuminator 373 is active, it may backlight the buttons on keypad 372 and stay on while the network computer is powered. Also, illuminator 373 may backlight these buttons in various patterns when particular actions are performed, such as dialing another network computer. Illuminator 373 may also enable light sources positioned within a transparent or translucent case of the network computer to illuminate in response to actions.

Further, network computer 350 may also comprise hardware security module (HSM) 369 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 369 may be a stand-alone computer, in other cases, HSM 369 may be arranged as a hardware card that may be added to a network computer.

Network computer 350 may also comprise input/output interface 365 for communicating with external peripheral devices or other computers such as other network computers and network computers. The peripheral devices may include an audio headset, virtual reality headsets, display screen glasses, remote speaker system, remote speaker and microphone system, and the like. Input/output interface 365 can utilize one or more technologies, such as Universal Serial Bus (USB), Infrared, WiFi, WiMax, Bluetooth™, and the like.

Input/output interface 365 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 350.

Haptic interface 378 may be arranged to provide tactile feedback to a user of the network computer. For example, the haptic interface 378 may be employed to vibrate network computer 350 in a particular way when another user of a computer is calling. Temperature interface 377 may be used to provide a temperature measurement input or a temperature changing output to a user of network computer 350. Open air gesture interface 376 may sense physical gestures of a user of network computer 350, for example, by using single or stereo video cameras, radar, a gyroscopic sensor inside a computer held or worn by the user, or the like. One or more cameras 366 may be used by an application to employ facial recognition methods to identify a user, track the user's physical eye movements, or take pictures (images) or videos.

GPS device 375 can determine the physical coordinates of network computer 350 on the surface of the Earth, which typically outputs a location as latitude and longitude values. GPS device 375 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 350 on the surface of the Earth. It is understood that GPS device 375 can employ a gyroscope to determine an orientation and/or an accelerometer to determine movement of the network computer 350. In one or more embodiment, however, network computer 350 may, through other components, provide other information that may be employed to determine a physical location of the network computer, including for example, a Media Access Control (MAC) address, IP address, and the like.

Human interface components can be peripheral devices that are physically separate from network computer 350, allowing for remote input or output to network computer 350. For example, information routed as described here through human interface components such as display 371 or keypad 372 can instead be routed through network interface 362 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a network computer with such peripheral human interface components is a wearable computer, which might include a remote pico projector along with one or more cameras that remotely communicate with a separately located network computer to sense a user's gestures toward portions of an image projected by the pico projector onto a reflected surface such as a wall or the user's hand.

Network computer 350 may include analysis and control app 357 that may be configured to remotely manage operation of an ABAS that is separate from a base station or the ABAS is integrated with a base station such as shown in FIGS. 2B and 2C. App 357 may provide information and metrics regarding communication of a remote wireless base station with a plurality of identified UEs. Also, app 357 may authorize and enable different types of users (e.g., technicians, customers, and the like) to use a displayed interface to quickly identify and troubleshoot technical problems, assist in orientation of beam waveforms generated by beam antennas to provide an optimal wireless communication downlink between a remote wireless base station and a plurality of identified UEs. The app may also enable adjustment of particular performance parameters to improve one or more aspects of the operation of the beam antennas. In one or more embodiments, app 357 may employ Bluetooth, wifi, or any other wireless or wired communication link to communicate with the RF communication device.

Network computer 350 may include filter app 380 that may be configured to remotely filter out reflections of uplink wireless RF signals to improve accuracy in determining the azimuth and elevations of each UE. App 380 enables improved accuracy by time shifting cross correlated data samples of uplink signals received by a minimum number of antennas utilized by an AoA antenna array, e.g., two antennas. In one or more of the various embodiments, app 380 may be configured to perform substantially similar, or all of the actions associated with filter component 231 as shown in FIGS. 2B and 2C, and also the filter component claimed herein.

Network computer 350 may include web browser application 359 that is configured to receive and to send web pages, web-based messages, graphics, text, multimedia, and the like. The network computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 352 may include RAM, ROM, or other types of memory. Memory 352 illustrates an example of computer-readable storage media (devices) for storage of information such as computer-readable instructions, data structures, program modules or other data. Memory 352 may store BIOS 354 for controlling low-level operation of network computer 350. The memory may also store operating system 353 for controlling the operation of network computer 350. It will be appreciated that this component may include a general-purpose operating system such as a version of UNIX, or LINUX™, or a specialized network computer communication operating system such as Windows Phone™, Apple iOS™ or the Symbian® operating system. The operating system may include, or interface with a Java virtual machine module that enables control of hardware components or operating system operations via Java application programs.

Memory 352 may further include one or more data storage 355, which can be utilized by network computer 350 to store, among other things, applications 356 or other data. For example, data storage 355 may also be employed to store information that describes various capabilities of network computer 350. The information may then be provided to another device or computer based on any of a variety of methods, including being sent as part of a header during a communication, sent upon request, or the like. Data storage 355 may also be employed to store social networking information including address books, buddy lists, aliases, user profile information, or the like. Data storage 355 may further include program code, data, algorithms, and the like, for use by a processor, such as processor 351 to execute and perform actions. In one embodiment, at least some of data storage 355 might also be stored on another component of network computer 350, including, but not limited to, non-transitory processor-readable removable storage device 364, processor-readable stationary storage device 363, or even external to the network computer.

Applications 356 may include computer executable instructions which, when executed by network computer 350, transmit, receive, or otherwise process instructions and data. Applications 356 may include, for example, analysis and control app 357, filter app 380, other applications 358, web browser 359, or the like. Network computers may be arranged to exchange communications, such as, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), network computer 350 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), network computer 350 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Generalized Operations

Figure 4A:
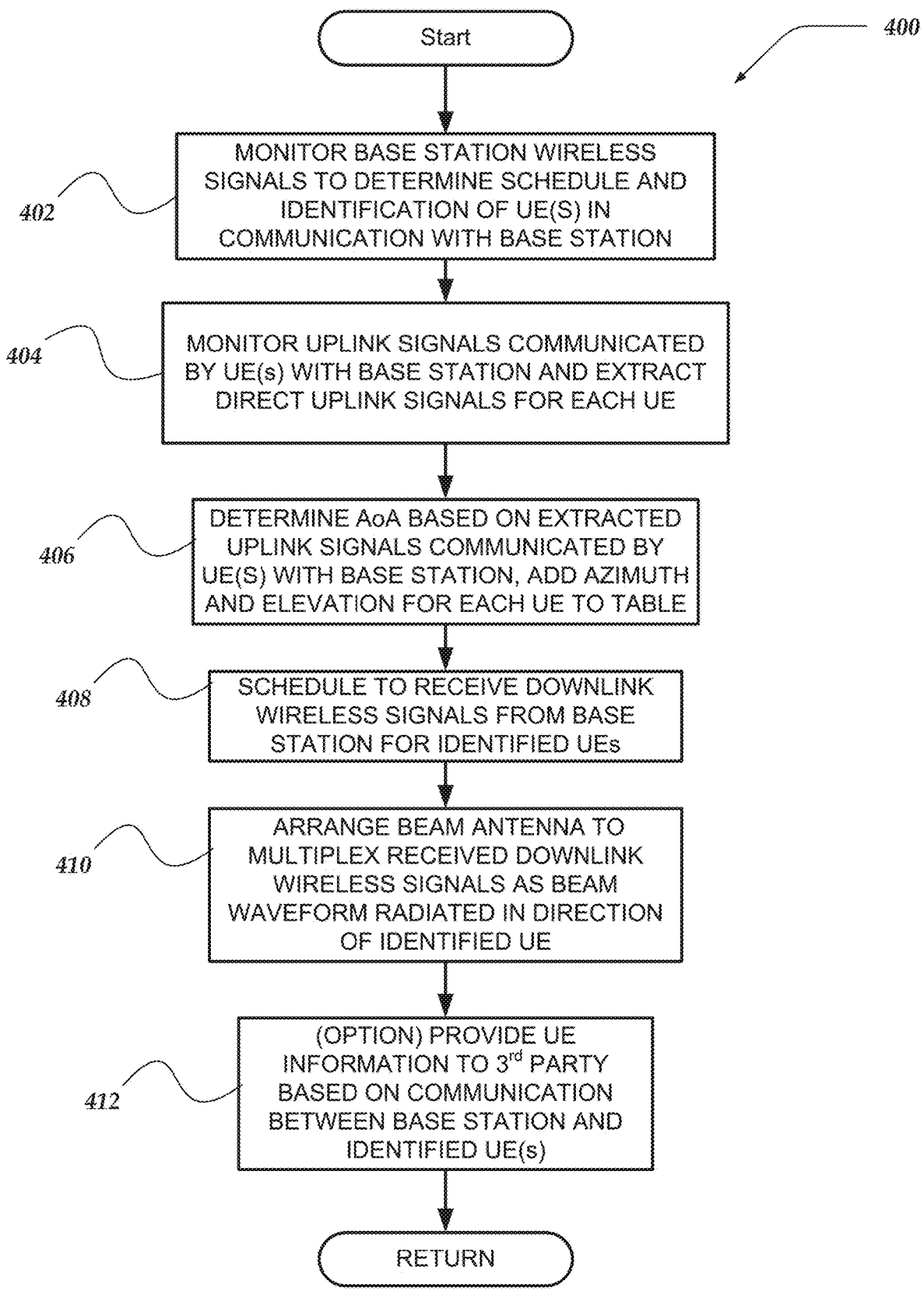
FIG. 4A illustrates an embodiment of a logical flow diagram for an exemplary method of improving downlink communication of wireless RF signals from a remotely located base station to a plurality of user wireless devices (UEs)

FIG. 4A illustrates a logical flow diagram of for an exemplary method of improving downlink communication of wireless signals from a remotely located base station to a plurality of user wireless devices (UEs). Moving from a start block, the process steps to block 402 where a download protocol decoder component monitors base station wireless signals to determine an allocation schedule for one or more of the UEs that are currently in wireless communication with the remote base station.

At block, 404, the process monitors received uplink wireless RF signals communicated by the one or more identified UEs to a remotely located base station. The allocation schedule and the monitored uplink wireless RF signals are employed to identify the one or more UEs that are currently in wireless communication with the base station. Additionally, the monitored uplink wireless RF signals are digitally processed to generate sampled data. In one or more embodiments, a pair (two) of antennas included in an AoA detector are employed to monitor the uplink wireless RF signals that are used to generate the sampled data. The monitored wireless RF uplink signals can often include a portion of direct path uplink wireless RF signals and another portion of multipath uplink wireless RF signals. Thus, the sampled data is filtered by a comparison of a cross correlated matrix populated with the sampled data to another cross correlated matrix populated with another version of the sampled data that is time shifted by a phase of the monitored uplink wireless RF signals. This comparison filters the sampled data to extract the portion representing the direct path uplink wireless RF signals while cancelling the other portion representing the multipath uplink wireless RF signals. See exemplary equations in FIGS. 5B and 5C and their accompanying text in this Specification for at least one embodiment of a mathematical proof for the filtering of sampled data representing the monitored uplink RF wireless signals. As shown, the proof teaches a comparison of a cross correlated matrix of time shifted data to another cross correlated matrix of non-time shifted data to extract the resultant portion of the filtered sampled data representing direct path uplink wireless RF signals.

Advancing to block 406, angle of arrival (AoA) information for each identified UE is determined based on the extracted portion of the sampled data, which is added to a table. This AoA information may include an angular location, e.g., azimuth and elevation, for each identified UE communicating with the remotely located base station.

In one or more embodiments, the filtering of the sampled data may not significantly improve an accuracy of the determined angular location of the identified UE based on the physical proximity of the UE and the two antennas being too close or too far from each other, and a physical size of a waveform for the uplink wireless RF signal. For example, an improvement in accuracy might be negligible when there is a short physical distance between the UE and the pair of antennas, e.g., 4 meters or less. Similarly, when the physical distance between the UE and the pair antennas is large, e.g., 1000 feet or more, the improvement in accuracy may be negligible.

At block 408, the schedule is employed to receive downlink wireless RF signals communicated to each identified UE during their allocated time period on the schedule. Further, the process advances to block 410 where the received downlink signals for each identified UE are proxied and retransmitted as beam waveforms radiated at the identified UE in a direction defined by the AoA information during the corresponding allocated time periods in the schedule.

Optionally, at block 412, different types of information may be determined regarding one or more UEs that receive the retransmitted downlink wireless signals in a beam waveform. The different types of information may include a wireless service provider/carrier associated with the one or more UEs, a determined location of each UE, an amount and frequency of downlink wireless signals retransmitted to each UE, or the like. Also, one or more of the different types of information may optionally be provided to third parties, such as wireless service providers/carriers, law enforcement, fire departments. Next, the process returns to performing other actions.

Figure 4B:
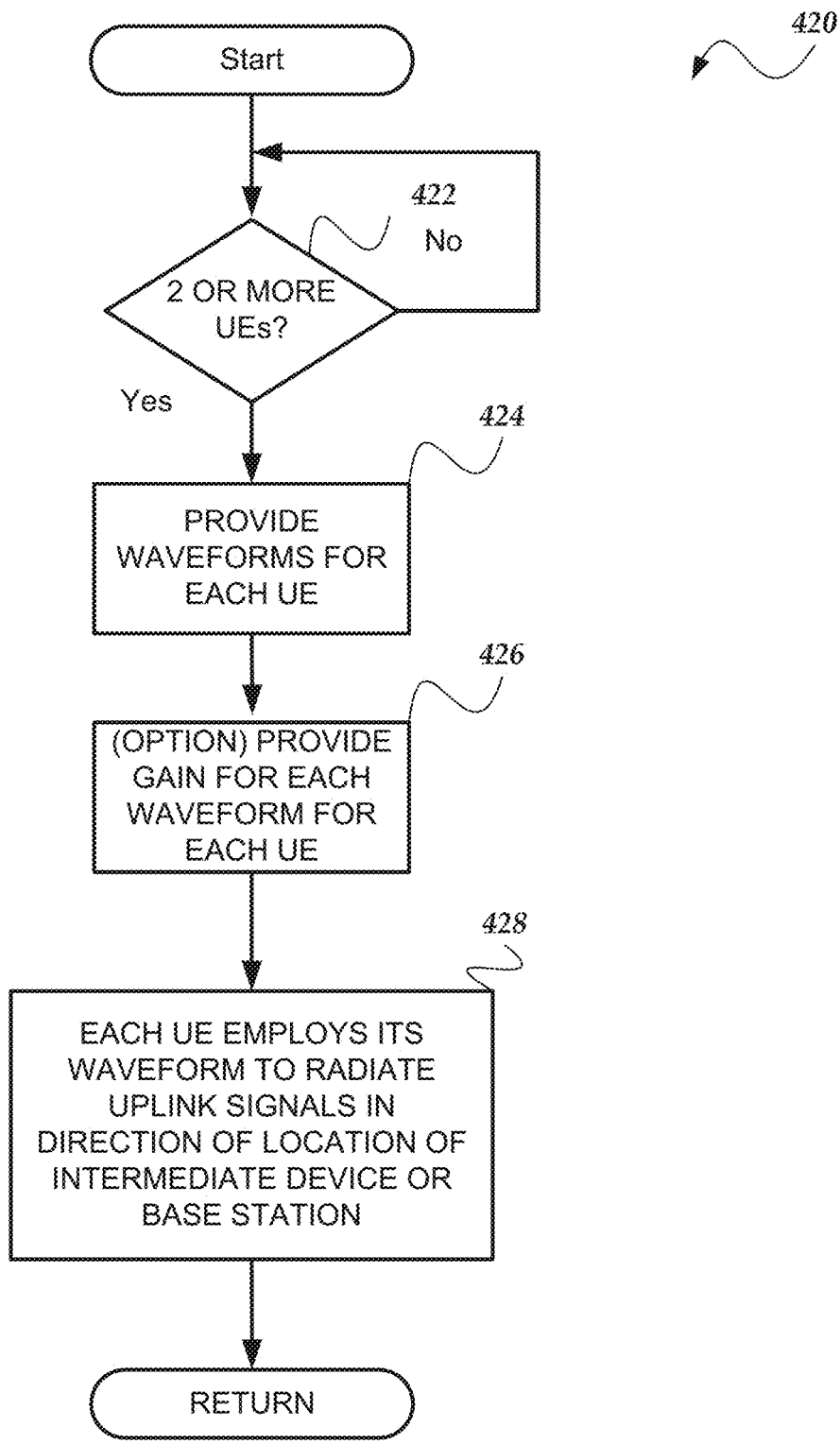
FIG. 4B shows an embodiment of a logical flow diagram for an exemplary method of simultaneously multiplexing multiple downlink wireless RF signals from a remotely located base station to two or more user wireless devices (UEs)

FIG. 4B illustrates a logical flow diagram of for an exemplary method 420 of simultaneously multiplexing multiple downlink wireless RF signals from a remotely located base station to two or more user wireless devices (UEs). Moving from a start block, the process steps to decision block 422, where a determination is made as to whether two or more UEs are identified for communication with the base schedule at overlapping time periods allocated on a schedule. If false, the process loops at decision block 422. However, once the determination at decision block 422 is true, the process moves to block 424 and a beam antenna is provided with two or more waveforms to multiplex two or more separate beams.

Optionally, at block 426 a gain of one or both of the separate beams is adjusted based on a strength of an uplink wireless signal communicated by one or both of the identified UEs that is less than a minimum threshold or greater than a maximum threshold. For example, if a strength of the uplink wireless RF signal communicated by an identified UE is below a minimum strength threshold, the gain of the corresponding beam of wireless downlink signals may be increased to compensate for a determined distance of the identified UE from the antenna controller component which is based in part on the determined lower strength of the uplink wireless RF signal. Similarly, if the strength of the uplink wireless RF signal communicated by an identified UE is above a maximum strength threshold, the gain of the corresponding beam of wireless downlink RF signals may be decreased to compensate for a determined distance of the identified UE from the antenna controller component which is based in part on the determined higher strength of the uplink wireless RF signals.

Next, the process flows to block 428 where, at overlapping time periods in a pointing schedule allocated for communication with the base station, the two or more separate beams are radiated in different directions defined by two or more azimuth and elevation coordinate pairs that correspond to the two or more identified UE. Further, in one or more embodiments, the beam antenna may include N separate beam forming antennas that employ N waveforms to generate and multiplex N separate beams in N different directions defined by N azimuth and elevation coordinate pairs that correspond to N identified UEs at overlapping time periods allocated in the pointing schedule.

Optionally, in one or more embodiments, the beam antenna may include both a beam forming antenna and an omnidirectional/sector directional antenna to provide communication with an identified UE from either antenna, or both, at the same allocated time in the schedule. The process may employ the two antennas to determine which antenna is able to provide optimal communication of wireless downlink signals to an identified UE, e.g., highest bandwidth with the lowest latency. Once the optimal determination is made for the identified UE, the process may use the determined antenna for further communication with the UE. Further, the process may optionally employ both a beam forming antenna and an omnidirectional/sector directional antenna to simultaneously provide communication of downlink wireless RF signals to two identified UEs that are allocated overlapping time periods in the pointing schedule. Also, the process may employ one or more policies to prioritize which of the two antennas provides communication with each of two identified UEs that have overlapping time periods allocated in the pointing schedule. Also, the process may optionally employ N beam forming antennas and N omnidirectional/sector directional antennas to simultaneously provide communication of downlink wireless RF signals to N identified UEs that are allocated overlapping time periods in the pointing schedule.

Next, the process moves to the return block and returns to performing other actions.

Figure 4C:
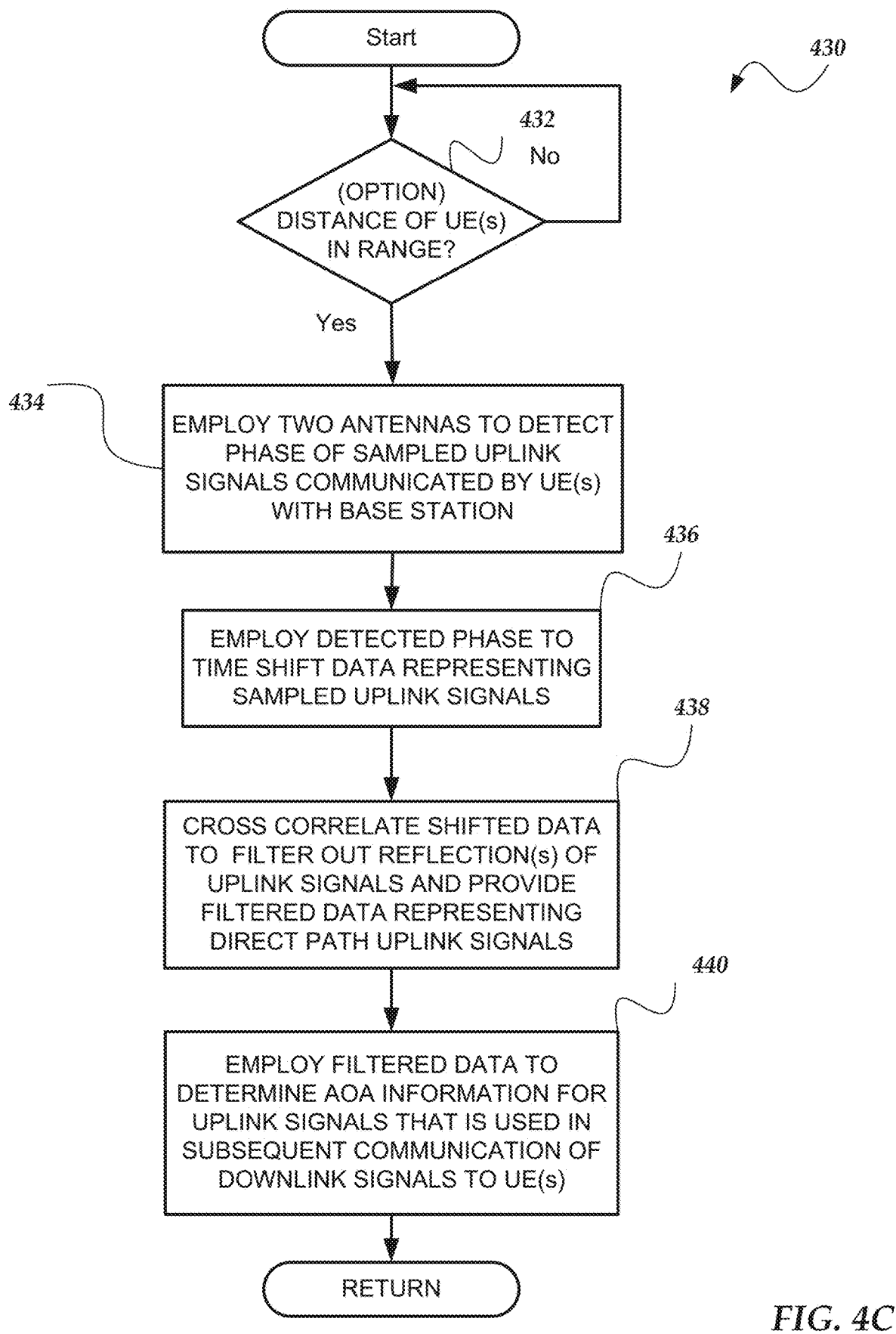
FIG. 4C illustrates an embodiment of a logic flow diagram for an exemplary method of cancelling out multipath uplink wireless RF signals from sampled data representing uplink wireless RF signals from one or more user wireless devices (UEs) that are monitored by two antennas.

FIG. 4C illustrates a logical flow diagram of exemplary method 430 for improving the accuracy of determining the angular location of an identified user wireless device (UE) based on received uplink wireless RF signals communicated by the identified UE to a remote base station.

Moving from a start block, the process optionally steps to decision block 432, where a determination is made as to whether a physical proximity of the identified UE is within a range for filtering multipath reflections of received uplink wireless RF signals communicated by the identified UE to the remote base station. If a physical size of a waveform radiating the uplink wireless RF signal is greater than a physical distance between the identified UE and at least two antennas of the AoA antenna array, e.g., 4 meters or less, or a physical distance between the identified UE and at least two antennas of the AoA antenna array is much greater than the physical size of the waveform, e.g., 1000 feet or more, then the process continues to monitor the uplink wireless RF signals until the physical proximity is within the range for filtering the multipath reflections of uplink wireless RF signals. Consequently, since an error in determining the angular location of an identified UE caused by multipath reflections of the uplink wireless RF signals may be relatively small outside the multipath filtering range, the filtering may not be performed to conserve computation resources and reduce energy consumption. In this case, an AoA antenna array may be employed to determine the angular location based on sampled data representing all of the portions of the uplink wireless RF signals (no filtering).

On the other hand, if the determination at optional decision block 432 is that a physical proximity/location of the identified UE and the two antennas is within the multipath filtering range, then the process advances to block 434. Alternatively, when decision block 432 is not optionally considered, then the process could move directly from the start block to block 434. In this way, continuous filtering of sampled data for multipath reflections of monitored uplink wireless RF signals would be performed without consideration of a physical proximity of the identified UE to the two antennas of the AoA antenna array.

At block 434, the two antennas are employed to sample data representing the monitored uplink wireless RF signals and detect a phase of the monitored uplink wireless RF signals. The monitored wireless RF uplink signals typically include a portion of direct path uplink wireless RF signals and another portion of multi-path uplink wireless RF signals. Moving to block 436, the detected phase is employed to time shift a version of the sampled data representing the monitored uplink wireless RF signals.

Stepping to block 438, the sampled data is filtered by comparing a separate cross correlated matrix populated with the sampled data to another cross correlated matrix populated with another version of the sampled data that is time shifted based at least in part on a phase of the monitored uplink wireless RF signals. The comparison results in the cancelling of sampled data representing multi-path uplink wireless RF signals while extracting a filtered version of the sampled data representing the direct path uplink wireless RF signals. Generally, this filtering employs a comparison of a cross correlated matrix of sampled data to another cross correlated matrix of time shifted version of the sampled data to extract the resultant filtered data.

At block 440, the remaining filtered data represents non-reflected (line of sight) uplink wireless RF signals that are used locally by an AoA antenna array detector, or remotely employed by one or more computers, to determine various types of AoA information that includes the angular location of the identified UE associated with the monitored uplink wireless RF signals. Next, the process returns to performing other actions.

Additionally, it will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Use Cases and Equations

Figure 5A:
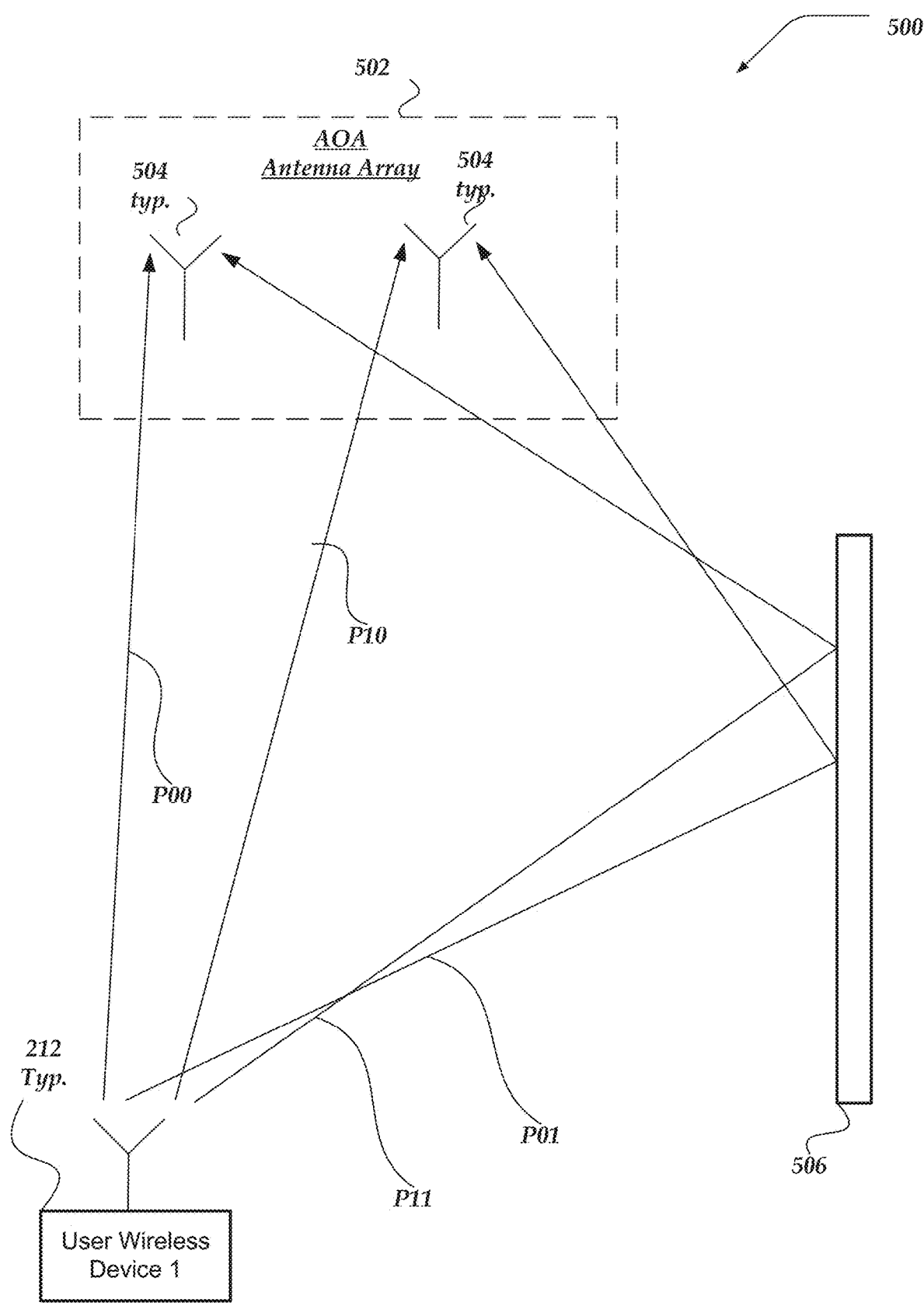
FIG. 5A shows a schematic view of a user wireless device radiating uplink wireless RF signals that are monitored by two remote antennas.

FIG. 5A shows a schematic view 500 of user wireless device (UE) 212 directly communicating uplink wireless RF signals P00 and P01 via line of sight paths with two remotely located antennas 504 that are included in AoA Antenna array 502. Also, uplink wireless RF signals P01 and uplink wireless RF signals P11 are communicated indirectly to antennas 504 by different multiple paths (multipath) caused by reflection from at least surface 506. Also, the lengths of the multipath reflections traveled by uplink wireless RF signals P01 and P011 are substantially greater than the lengths of line of sight paths traveled by uplink wireless RF signals P00 and P01 to reach antennas 504. In one or more embodiments, determining a precise angular location of identified UE 212 is related to a size of the difference in a physical distance traveled to reach the two antennas by the direct path uplink wireless RF signals versus the multipath uplink wireless RF signals.

FIGS. 5B and 5C illustrate exemplary equations for a mathematical proof for the exemplary filtering of sampled data representing monitored uplink wireless RF signals radiated by a UE and received by two antennas. In one or more embodiments, the exemplary filtering removes sampled data representing multipath uplink wireless RF signals and the remaining sampled data represents direct path uplink wireless RF signals to provide improved accuracy in determining AoA information based on sampled data representing uplink wireless RF signals monitored by two antennas.

The equations create two cross correlation matrices. The first, R_00, contains a set of complex conjugate dot product results of each pair of antennas. The second, R_01 contains a similar matrix except that for each antenna pair the correlation is performed on A_0 B_1, where A_0 is the data from antenna A, and B_1 is the data from antenna B shifted by 1 sample. The extra correlation matrix provides an additional algebraic constraint that allows extraction of the direct path uplink wireless signal and removal of the multipath uplink wireless signal from time sampled data representing the uplink wireless RF signals detected by the pair of antennas.

Although the equations are directed to cross correlating shifted sampled data for uplink wireless RF signals detected by a pair of antennas, the invention is not constrained to just two antennas. In other embodiments, time sampled data for downlink and/or uplink wireless RF signals detected by multiple pairs of antennas may be filtered in substantially the same manner with substantially similar cross correlated matrices and equations.

The above specification, examples, and data provide a complete description of the manufacture and use of the invention. Since many embodiments of the invention can be made without departing from the spirit and scope of the invention, the invention resides in the claims hereinafter appended.

What is claimed as new and desired to be protected by Letters Patent of the United States is:

1. A device for communicating wireless signals with a plurality of user devices (UE), comprising:
    a downlink detector component that performs actions, including:
        monitoring downlink wireless radio frequency (RF) signals communicated by a base station to identify each UE that is communicating uplink wireless RF signals with the base station; and
    an antenna component that performs actions, including:
        employing one or more pairs of antennas to monitor uplink wireless signals communicated by each identified UE to the base station; and
        providing sampled data representing the monitored uplink wireless RF signals, wherein the sampled data includes a first portion representing direct path uplink wireless RF signals and a second portion representing multipath uplink wireless RF signals; and
    a filter component that performs actions, including:
        generating a shifted version of the sampled data, wherein a shifting of the sampled data is based on a phase of the monitored uplink wireless RF signals;
        generating a cross correlated matrix based on the sampled data;
        generating another cross correlated matrix based on the shifted version of the sampled data; and
        filtering the sampled data by a comparison of the cross correlated matrix to the other cross correlated matrix to extract the first portion of the sampled data representing direct path uplink wireless RF signals and cancel the second portion of the sampled data representing multipath uplink wireless RF signals; and
    wherein the antenna component employs the extracted first portion of the sampled data to determine an angular location of each identified UE that includes an azimuth and an elevation, and wherein the determined angular location of an identified UE is employed to arrange a beam antenna to generate a beam directed at the identified UE, and wherein the beam communicates downlink wireless RF signals transmitted by the base station to the identified UE.

2. The device of claim 1, wherein the downlink detector component performs further actions, including:
    determining a protocol for monitored control wireless RF signals communicated by the base station, wherein the determined protocol for the control wireless RF signals is used to identify each UE that is allocated a time period in a schedule for communicating downlink and uplink wireless RF signals between the base station and each identified UE.

3. The device of claim 1, wherein the filter component performs further actions, comprising:
    in response to a physical proximity of the identified UE to the one or more pairs of antennas being within a range, employing the extracted first portion of the sampled data to determine the angular location of each identified UE; and in response to the physical proximity of the identified UE to the one or more pairs of antennas being outside the range, employing non-filtered sampled data to determine the angular location of each identified UE.

4. The device of claim 1, wherein extraction of the first portion of the sampled data further comprises:

continuously sampling the monitored uplink wireless RF signals for each identified UE to provide the extracted first portion of the sampled data in real time.

5. The device of claim 1, wherein the filter component performs further actions, including:

in response to a physical proximity of the identified UE to a physical location of the antenna component being outside a range, employing sample data that is non-filtered to determine the angular location of each identified UE.

6. The device of claim 1, further comprising:

a controller component that performs actions, including one or more of:

employing the angular location for each identified UE to arrange a beam antenna to multiplex generation of separate beams of downlink wireless RF signals in a determined direction of each identified UE; or determining a physical distance between the antenna component and each identified UE based on the angular location and a gain of the uplink wireless RF signals that correspond to each identified UE.

7. The device of claim 1, further comprising:

one or more other pairs of antennas to monitor uplink wireless RF signals communicated by each identified UE to the base station, wherein the one or more other pairs of antennas provide other sampled data representing the monitored uplink wireless RF signals; and employing the filter component to extract another filtered portion that represents the direct path uplink wireless RF signals from the other sampled data, wherein the other filtered portion is employed to further improve accuracy in determining the angular location of each identified UE.

8. A method for communicating wireless signals with a plurality of user devices (UE), wherein one or more processors execute instructions to perform actions, comprising:

employing a downlink detector component to perform further actions, including:

monitoring downlink wireless radio frequency (RF) signals communicated by a base station to identify each UE that is communicating uplink wireless RF signals with the base station; and employing an antenna component to perform actions, including:

employing one or more pairs of antennas to monitor uplink wireless signals communicated by each identified UE to the base station; and providing sampled data representing the monitored uplink wireless RF signals, wherein the sampled data includes a first portion representing direct path uplink wireless RF signals and a second portion representing multipath uplink wireless RF signals; and employing a filter component to perform further actions, including:

generating a shifted version of the sampled data, wherein a shifting of the sampled data is based on a phase of the monitored uplink wireless RF signals;

generating a cross correlated matrix based on the sampled data;

generating another cross correlated matrix based on the shifted version of the sampled data; and filtering the sampled data by a comparison of the cross correlated matrix to the other cross correlated matrix to extract the first portion of the sampled data representing direct path uplink wireless RF signals and cancel the second portion of the sampled data representing multipath uplink wireless RF signals; and wherein the antenna component employs the extracted first portion of the sampled data to determine an angular location of each identified UE that includes an azimuth and an elevation, and wherein the determined angular location of an identified UE is employed to arrange a beam antenna to generate a beam directed at the identified UE, and wherein the beam communicates downlink wireless RF signals transmitted by the base station to the identified UE.

9. The method of claim 8, wherein the downlink detector component performs further actions, including:

determining a protocol for monitored control wireless RF signals communicated by the base station, wherein the determined protocol for the control wireless RF signals is used to identify each UE that is allocated a time period in a schedule for communicating downlink and uplink wireless RF signals between the base station and each identified UE.

10. The method of claim 8, wherein the filter component performs further actions, comprising:

in response to a physical proximity of the identified UE to the one or more pairs of antennas being within a range, employing the extracted first portion of the sampled data to determine the angular location of each identified UE; and in response to the physical proximity of the identified UE to the one or more pairs of antennas being outside the range, employing non-filtered sampled data to determine the angular location of each identified UE.

11. The method of claim 8, wherein extraction of the first portion of the sampled data further comprises:

continuously sampling the monitored uplink wireless RF signals for each identified UE to provide the extracted first portion of the sampled data in real time.

12. The method of claim 8, wherein the filter component performs further actions, including:

in response to a physical proximity of the identified UE to a physical location of the antenna component being outside a range, employing sample data that is non-filtered to determine the angular location of each identified UE.

13. The method of claim 8, further comprising:

a controller component that performs actions, including one or more of:

employing the angular location for each identified UE to arrange a beam antenna to multiplex generation of separate beams of downlink wireless RF signals in a determined direction of each identified UE; or determining a physical distance between the antenna component and each identified UE based on the angular location and a gain of the uplink wireless RF signals that correspond to each identified UE.

14. The method of claim 8, further comprising:

one or more other pairs of antennas to monitor uplink wireless RF signals communicated by each identified UE to the base station, wherein the one or more other pairs of antennas provide other sampled data representing the monitored uplink wireless RF signals; and employing the filter component to extract another filtered portion that represents the direct path uplink wireless RF signals from the other sampled data, wherein the other filtered portion is employed to further improve accuracy in determining the angular location of each identified UE.

15. A system for communicating wireless signals with a plurality of user devices (UE) over a network, comprising:
a downlink detector component that performs actions, including:
monitoring downlink wireless radio frequency (RF) signals communicated by a base station to identify each UE that is communicating uplink wireless RF signals with the base station; and
an antenna component that performs actions, including:
employing one or more pairs of antennas to monitor uplink wireless signals communicated by each identified UE to the base station; and
providing sampled data representing the monitored uplink wireless RF signals, wherein the sampled data includes a first portion representing direct path uplink wireless RF signals and a second portion representing multipath uplink wireless RF signals; and
a network computer, including:
a memory for storing instructions; and
one or more processors that execute the instructions to perform actions, comprising:
employing a filter component to perform further actions, including:
generating a shifted version of the sampled data, wherein a shifting of the sampled data is based on a phase of the monitored uplink wireless RF signals;
generating a cross correlated matrix based on the sampled data;
generating another cross correlated matrix based on the shifted version of the sampled data; and
filtering the sampled data by a comparison of the cross correlated matrix to the other cross correlated matrix to extract the first portion of the sampled data representing direct path uplink wireless RF signals and cancel the second portion of the sampled data representing multipath uplink wireless RF signals; and
employing the extracted first portion of the sampled data to determine an angular location of each identified UE that includes an azimuth and an elevation; and
employing the determined angular location of an identified UE to arrange a beam antenna to generate a beam directed at the identified UE, and wherein the beam communicates downlink wireless RF signals transmitted by the base station to the identified UE.

16. The system of claim 15, wherein the downlink detector component performs further actions, including:
determining a protocol for monitored control wireless RF signals communicated by the base station, wherein the determined protocol for the control wireless RF signals is used to identify each UE that is allocated a time period in a schedule for communicating downlink and uplink wireless RF signals between the base station and each identified UE.

17. The system of claim 15, wherein the filter component performs further actions, comprising:
in response to a physical proximity of the identified UE to the one or more pairs of antennas being within a range, employing the extracted first portion of the sampled data to determine the angular location of each identified UE; and
in response to the physical proximity of the identified UE to the one or more pairs of antennas being outside the range, employing non-filtered sampled data to determine the angular location of each identified UE.

18. The system of claim 15, wherein the filter component performs further actions, including:
in response to a physical proximity of the identified UE to a physical location of the antenna component being outside a range, employing sample data that is non-filtered to determine the angular location of each identified UE.

19. The system of claim 15, wherein the one or more processors execute the instructions to perform further actions, comprising:
employing the angular location for each identified UE to arrange a beam antenna to multiplex generation of separate beams of downlink wireless RF signals in a determined direction of each identified UE; or
determining a physical distance between the antenna component and each identified UE based on the angular location and a gain of the uplink wireless RF signals that correspond to each identified UE.

20. The system of claim 15, further comprising:
one or more other pairs of antennas to monitor uplink wireless RF signals communicated by each identified UE to the base station, wherein the one or more other pairs of antennas provide other sampled data representing the monitored uplink wireless RF signals; and
wherein the filter component extracts another filtered portion that represents the direct path uplink wireless RF signals from the other sampled data, wherein the other filtered portion is employed to further improve accuracy in determining the angular location of each identified UE.

* * * * *